United States Patent
Christian et al.

(10) Patent No.: US 8,339,584 B2
(45) Date of Patent: Dec. 25, 2012

(54) VELOCITY MEASURING SYSTEM

(75) Inventors: William R. Christian, Newbury Park, CA (US); Ray C. Delcher, Oxnard, CA (US); Tong Chen, Palo Alto, CA (US); Mohsen Khoshnevisan, Newbury Park, CA (US); Phillip B. Liescheski, Lincoln, NE (US); Michael A. Metcalf, San Diego, CA (US)

(73) Assignee: Teledyne Technologies Incorporated, Thousand Oaks, CA (US)

( * ) Notice: Subject to any disclaimer, the term of this patent is extended or adjusted under 35 U.S.C. 154(b) by 170 days.

(21) Appl. No.: 12/800,750

(22) Filed: May 21, 2010

(65) Prior Publication Data

US 2011/0285984 A1    Nov. 24, 2011

(51) Int. Cl.
    *G01P 3/36* (2006.01)
(52) U.S. Cl. .................................. 356/28.5; 356/28
(58) Field of Classification Search ........ 356/3.01–3.15, 356/4.01–4.1, 5.01–5.15, 6–22, 28, 28.5
    See application file for complete search history.

(56) References Cited

U.S. PATENT DOCUMENTS

| | | | |
|---|---|---|---|
| 3,915,572 A | 10/1975 | Orloff | |
| 3,956,928 A | 5/1976 | Barrera | |
| 4,026,655 A | 5/1977 | Gunter, Jr. | |
| 4,572,664 A | 2/1986 | Hanson | |
| 4,737,798 A | 4/1988 | Lonis | |
| 4,919,536 A | 4/1990 | Komine | |
| 4,948,257 A | 8/1990 | Kaufman | |
| 5,164,784 A * | 11/1992 | Waggoner | 356/28.5 |
| 5,315,880 A | 5/1994 | Bailey | |
| 5,371,686 A | 12/1994 | Nabity et al. | |
| 5,557,536 A | 9/1996 | Nabity et al. | |
| 5,574,589 A | 11/1996 | Feuer | |
| RE35,535 E | 6/1997 | Brumley et al. | |
| 5,701,172 A | 12/1997 | Azzazy | |
| 5,726,358 A | 3/1998 | Kölling | |
| 5,777,892 A | 7/1998 | Nabity et al. | |
| 5,811,688 A | 9/1998 | Marsh | |
| 5,956,353 A | 9/1999 | Nguyen | |
| 5,982,789 A | 11/1999 | Marshall | |
| 6,647,804 B1 | 11/2003 | Deines | |
| 6,782,150 B2 | 8/2004 | Davis et al. | |
| 6,885,438 B2 | 4/2005 | Deines | |
| 7,061,592 B2 | 6/2006 | Deines | |
| 7,267,013 B2 | 9/2007 | Maler | |
| 2001/0021207 A1 | 9/2001 | Serizawa | |
| 2002/0176091 A1 | 11/2002 | Deck | |
| 2003/0142288 A1 * | 7/2003 | Kinrot et al. | 356/28 |
| 2005/0109041 A1 | 5/2005 | Tanaka | |
| 2007/0058157 A1 | 3/2007 | Deines | |

(Continued)

OTHER PUBLICATIONS

Applicants disclosure.*

(Continued)

*Primary Examiner* — Luke Ratcliffe
(74) *Attorney, Agent, or Firm* — Suiter Swantz pc llo

(57) ABSTRACT

A laser Doppler velocimeter uses self-mixing amplification of backreflections from scatterers below the surface of a flow. A time domain signal is divided into segments that are roughly equal to a transit time of particles through a focus of a laser beam. The segments are connected to a frequency domain through the use of an FFT algorithm to produce frequency domain data segments. Signal-to-noise ratio is enhanced through signal processing techniques using the segments to produce a final enhanced signal spectrum.

22 Claims, 14 Drawing Sheets

U.S. PATENT DOCUMENTS

2007/0263205 A1    11/2007    Deines

OTHER PUBLICATIONS

Nordin, Daniel, et al., "Advantages of a new modulation scheme in an optical self-mixing frequency-modulated continuous-wave system"; Optical Engineering, vol. 41, No. 5, Jan. 1, 2002, pp. 1128-1133.

Extended European Search Report for application EP 11004133, dated Dec. 13, 2011.

"A Simple L2F Velocimeter Based on Self-Mixing of Laser Diodes", 14$^{th}$ Int Symp on Applications of Laser Techniques to Fluid Mechanics, Lisbon, Portugal, Jul. 7-10, 2008 by Humberto Chaves and Torben Seifert, pp. 1-4.

"Low cost velocity sensor based on the self-mixing effect in a laser diode", OPTO-Electronics Rebiew 11(4), 313-319 (2003) by > Kruhut, J. Hast, E. Alarousu, and R. Myllylä.

Blood flow detection with diode laser, Meigas K, et al.; *Engineering in medicine and biology society*; vol. 1, (Jul. 23, 2000) pp. 251-253.

Optical flowmeter for blod extracorporeal circulators, Pesatori N.; *2009 IEEE Instrumentation and Measurement Technology Conference*;(May 5, 2009)pp. 1759-1762.

* cited by examiner

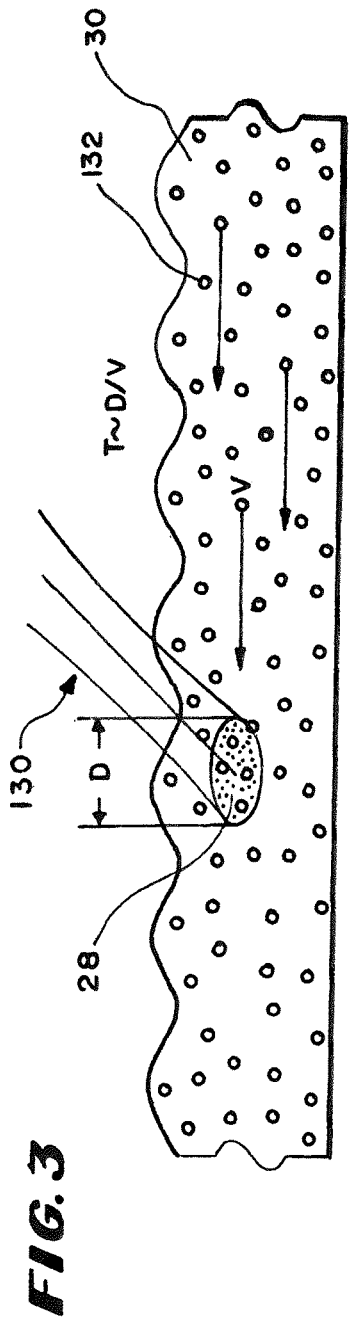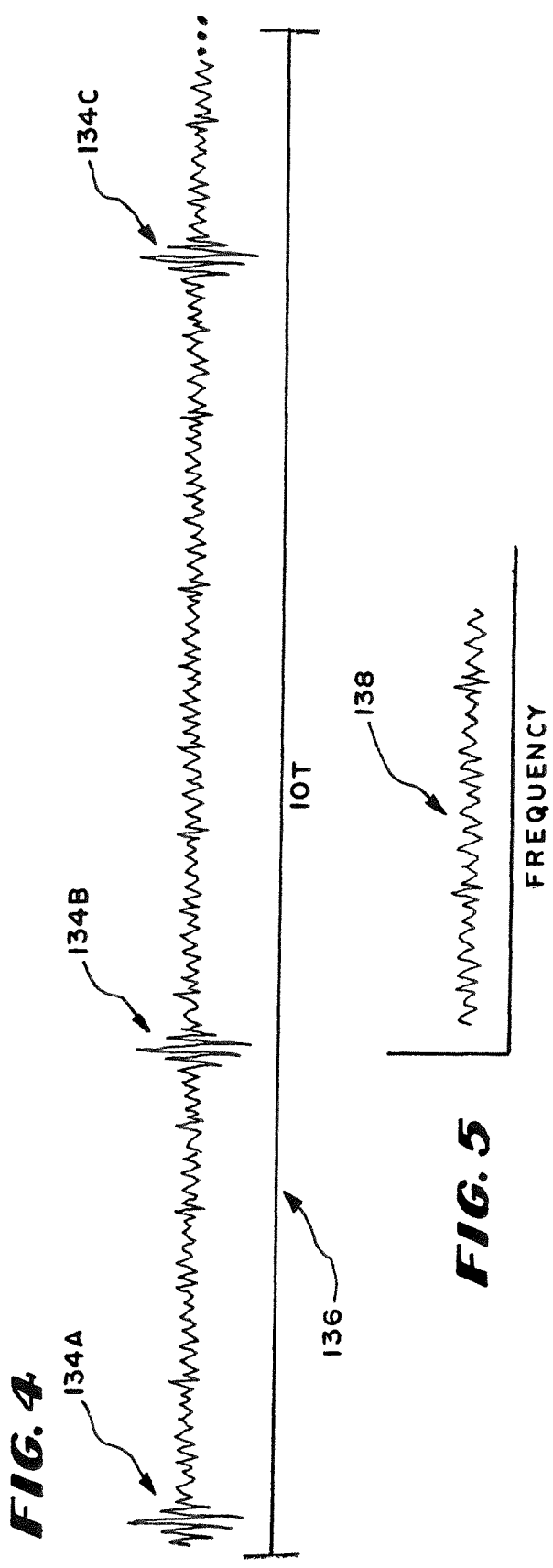
FIG. 3
FIG. 4
FIG. 5

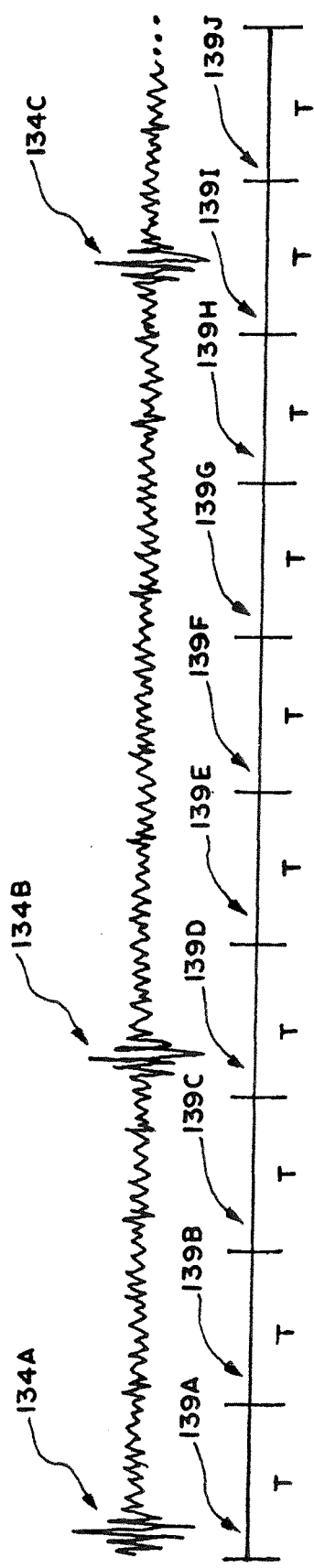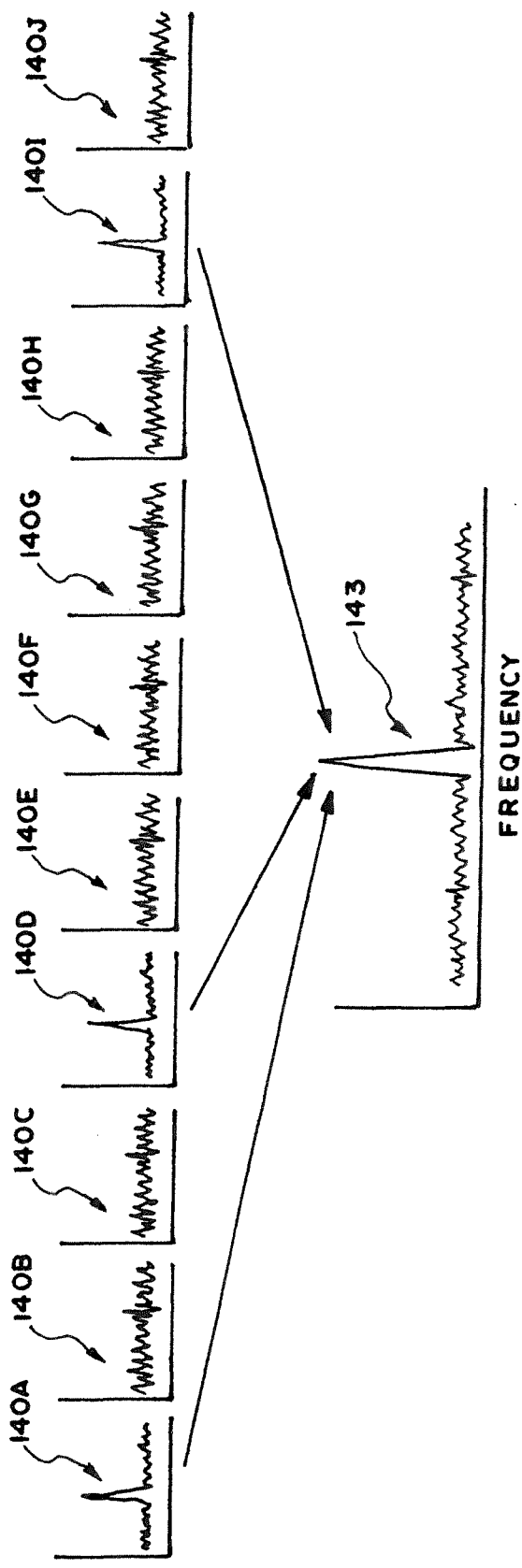

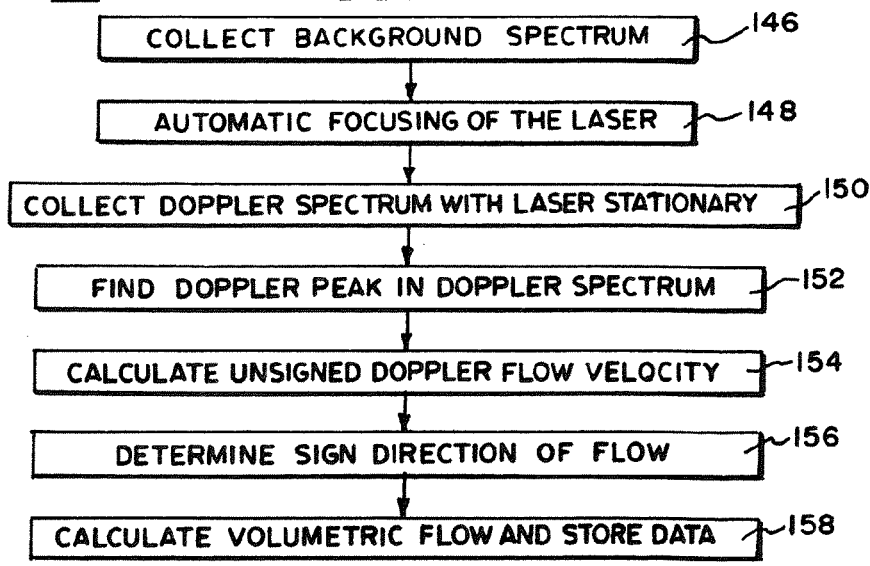
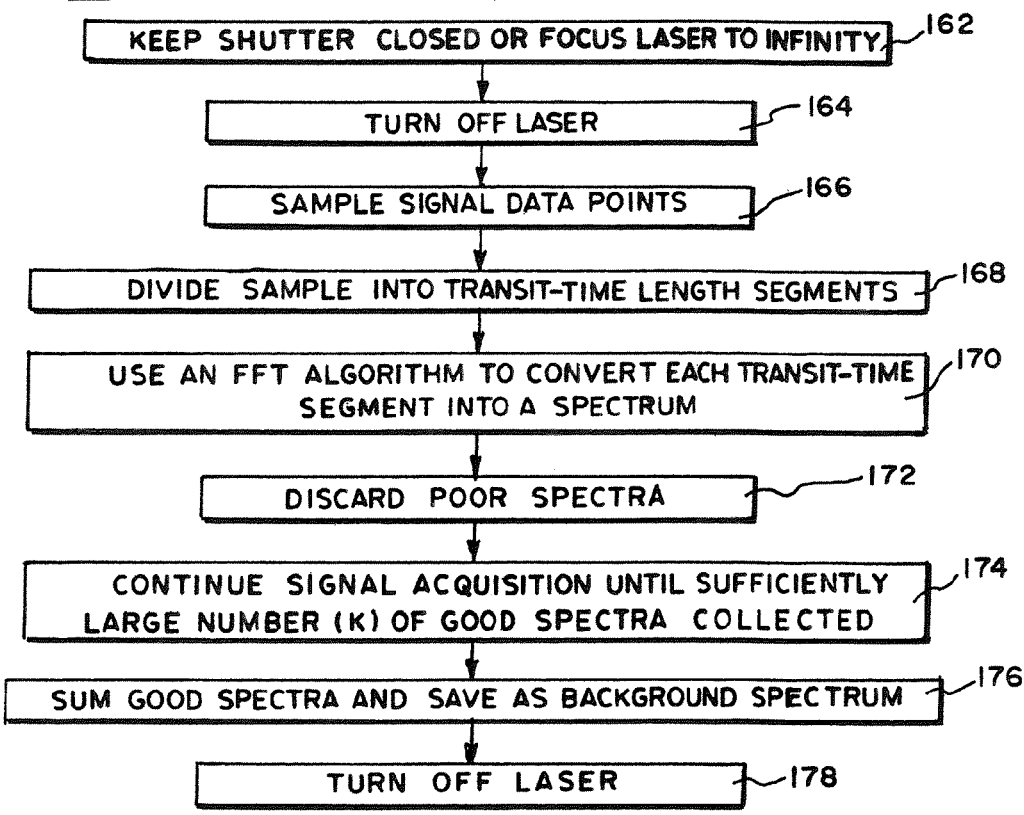

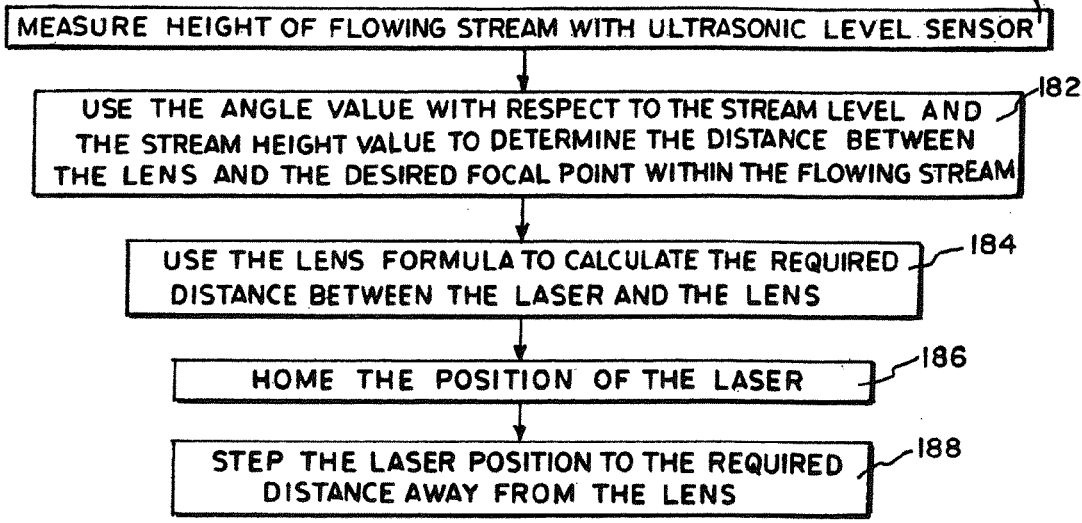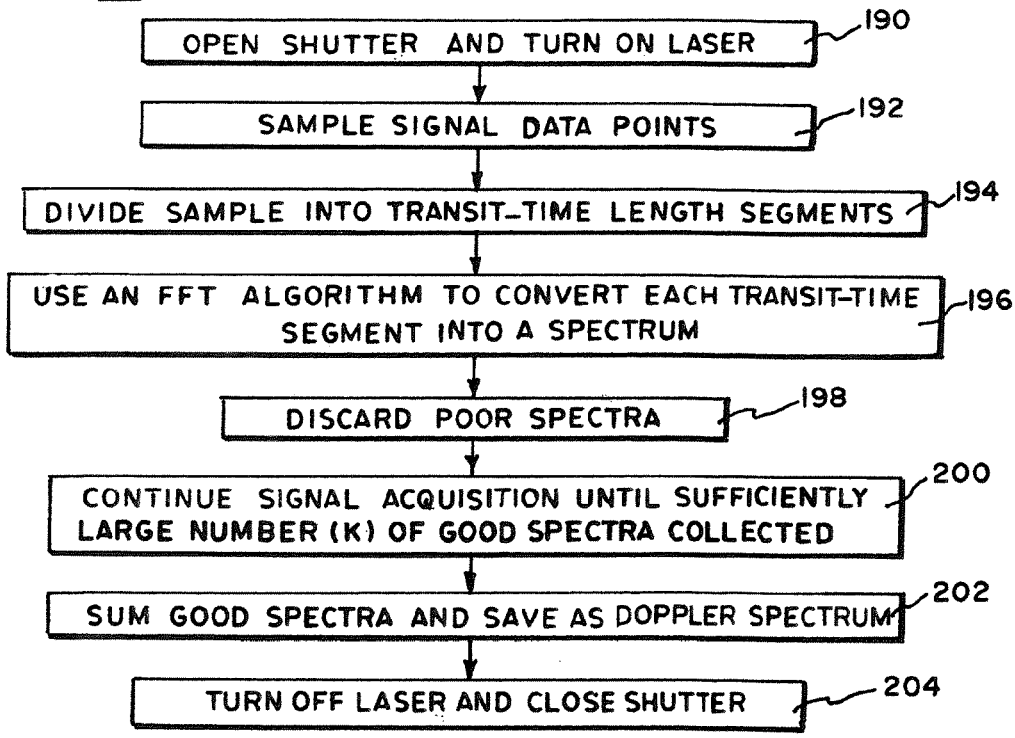

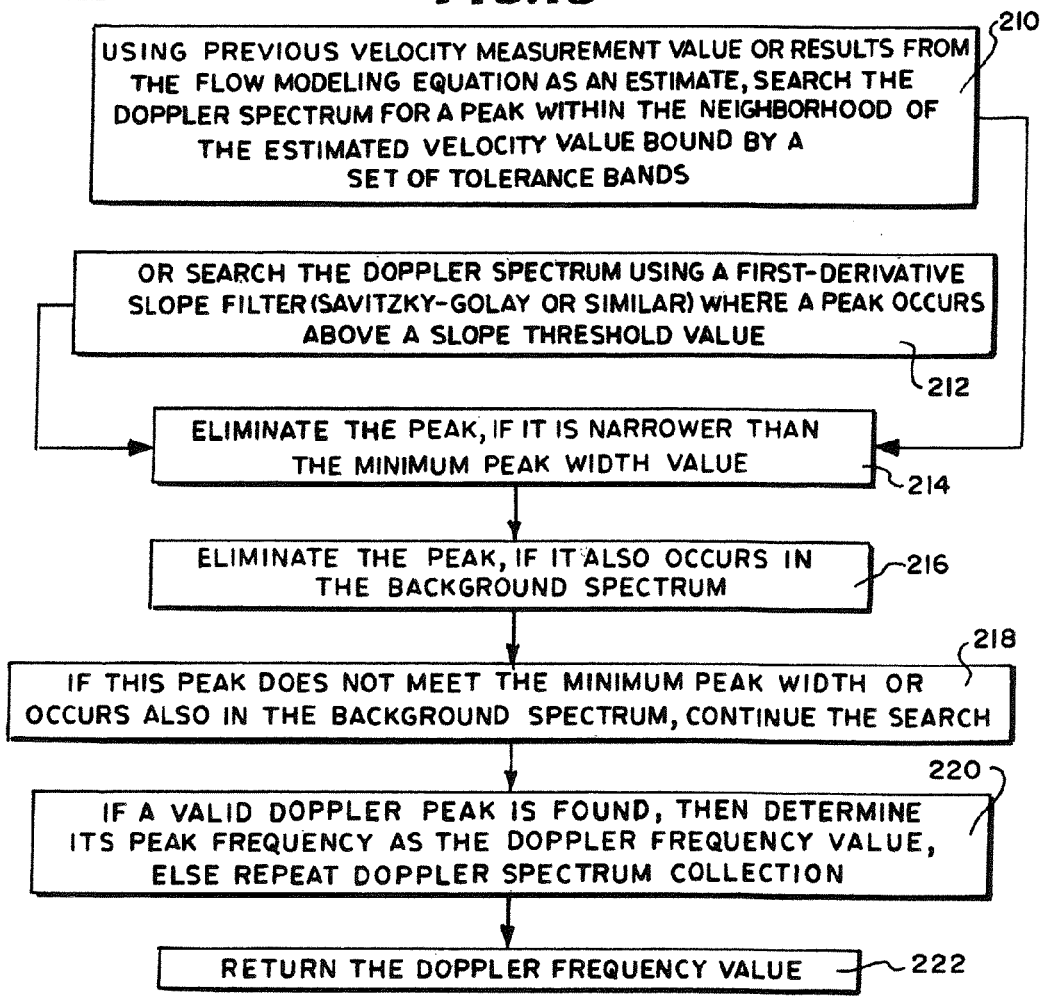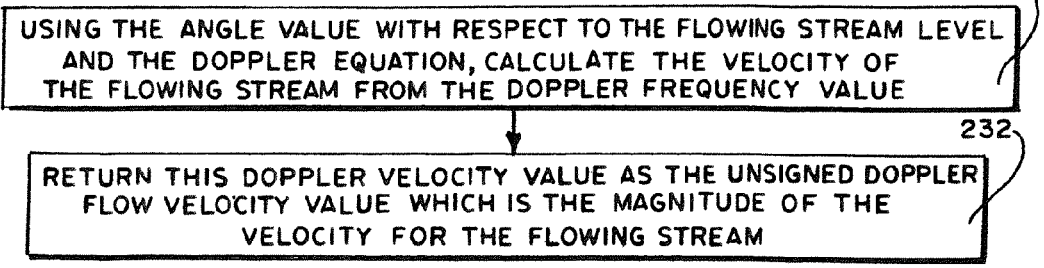

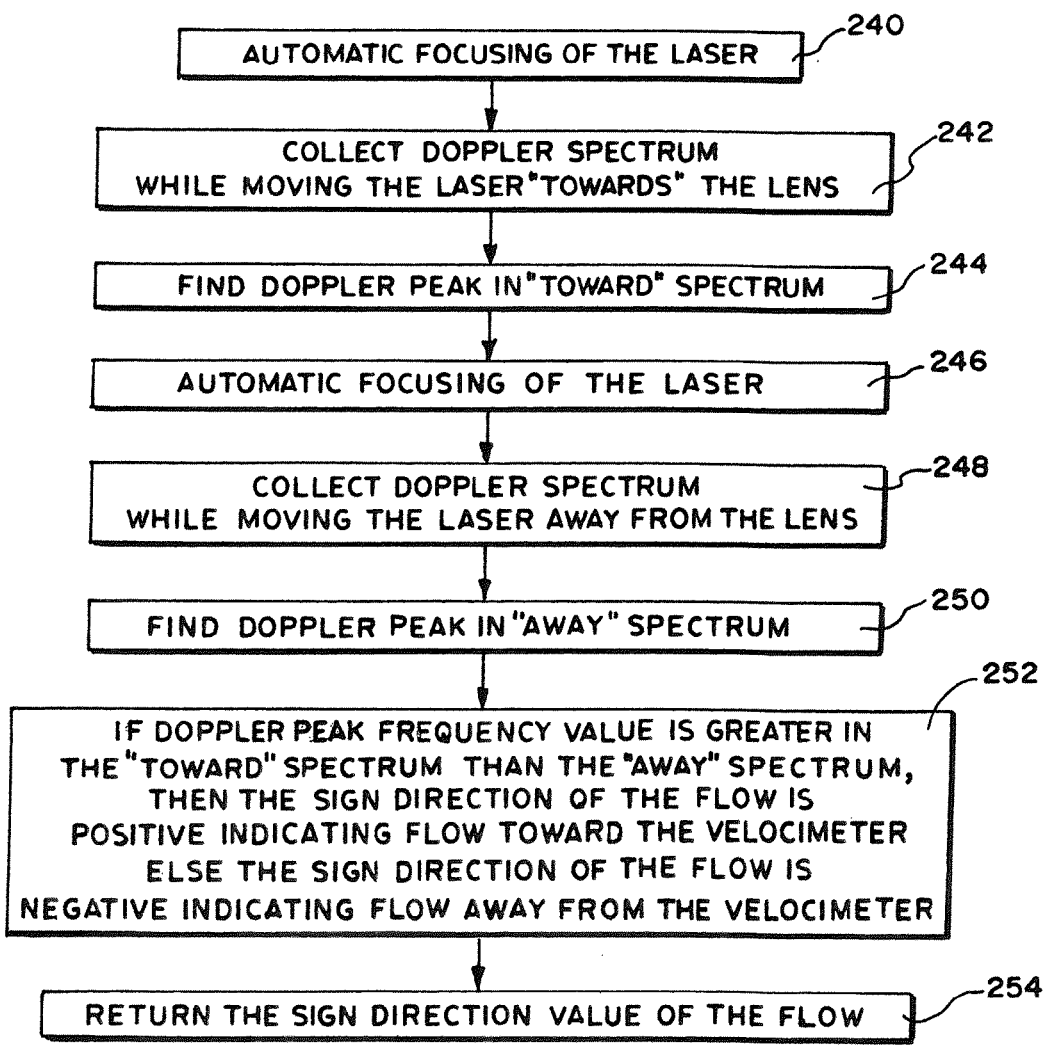

- CALCULATE THE CROSS-SECTIONAL AREA OF THE FLOWING STREAM USING THE STREAM HEIGHT VALUE AND KNOWLEDGE OF THE PIPE GEOMETRY — 260
- CALCULATE VOLUMETRIC FLOW VALUE FROM THE ABOVE CROSS-SECTIONAL AREA, THE UNSIGNED DOPPLER FLOW VELOCITY VALUE AND SIGN DIRECTION OF THE FLOW — 262
- DETERMINE THE AVERAGE VOLUMETRIC FLOW VALUE BY USING INDUSTRY ACCEPTED METHOD OR FROM PROFILING THE STREAM BY FOCUSING THE LASER MULTIPLE FOCAL POINTS AT VARIOUS DEPTHS AND LOCATIONS (SIDE-TO-SIDE) BELOW THE SURFACE OF THE STREAM — 264
- USING THE ABOVE AVERAGE VOLUMETRIC FLOW VALUE, OPTIMIZE PARAMETERS IN THE FLOW MODELING EQUATION AS LEARNING PROCESS ABOUT THE PARTICULAR SITE FOR IMPROVED ESTIMATES IN FUTURE MEASUREMENTS — 266

- BLOCK OR REMOVE AT LEAST SOME OF THE STREAM SURFACE REFLECTION FROM THE SIGNAL USED TO DETERMINE DOPPLER VELOCITY OF THE FLOW STREAM — 272
- USE THE LASER LIGHT SCATTERED BACK FROM MULTIPLE FOCAL POINTS COVERING A SUBSTANTIAL CROSS-SECTIONAL AREA TO DETERMINE THE AVERAGE VOLUMETRIC FLOW OF THE STREAM — 274
- OR USE THE LASER LIGHT SCATTERED BACK FROM A SINGLE FOCAL POINT TO DETERMINE A FLOW VELOCITY OF THE STREAM AT THE FOCAL POINT AND/OR THE MEAN OR AVERAGE VELOCITY OF THE FLOW STREAM IN ORDER TO CALCULATE THE AVERAGE VOLUMETRIC FLOW — 276

VELOCITY MEASURING SYSTEM

BACKGROUND OF THE INVENTION

This invention relates to methods and apparatuses for measuring the average velocity of an open channel flow using electromagnetic radiation such as, for example, laser signals to determine velocity by Doppler shift techniques without physically contacting the flow but measuring the flow below the surface.

In one class of Doppler shift remote sensing of the velocity of an open channel flow, a laser beam is transmitted to a flow from above and the backscatter received from scatterers in the fluid such as bubbles, solid objects (e.g. debris) or microscopic particles (e.g. colloid) causing turbidity, carried by the flow are sensed. The Doppler shift in frequency between the transmitted signal and the returned signal is used to determine the velocity of the portion of the flow sampled by the laser beam. In one embodiment, the average volumetric flow rate of the sample is determined by combining the average velocity of the flow stream measured by the laser Doppler velocimeter with other data such as the height of the flow in the channel and the geometry of the channel. In another embodiment, the average flow velocity is determined by measuring the velocity of the flow at multiple locations across the flow and combining the readings to arrive at an average.

In one prior art Doppler-shift flow meter in this class, a laser transmits a signal to the surface of a flowing stream where objects on the surface reflect signals back. The Doppler shift between the transmitted and reflected light is used to determine the velocity of the surface of the flow. The localized mean velocity is calculated from the surface velocity while the average velocity of the entire flow is calculated from the mean velocity using the level of the flow and the cross section of the stream bed. A system of this type is disclosed in U.S. Pat. No. 5,811,688. This technique has the disadvantages of being inaccurate under some circumstances due to the difficulty in accurately arriving at the mean flow velocity from the surface velocity, and of detecting a signal when there are few suitable reflectors on the surface.

In still another velocity measuring, Doppler-shift, prior art technique, frequency modulated laser beams are transmitted to a target from a laser diode and the velocity of the target is determined from the Doppler shift of harmonic frequency reflected signals and the transmitted signals. This technique is disclosed in U.S. Pat. Nos. 6,885,438 and 7,061,592. This prior art is taught only in connection with solid targets with a focal point on the surface of the target and thus does not relate to some of the unique problems associated with measuring open channel flows.

In still another prior art type of fluid velocity measuring technique, self-mixing and self amplifying laser diodes transmit beams to two spaced apart focal points within the flowing stream. Flow velocity is measured by the time it takes for fluid to move between the two points. This technique relies on the identification of unique signatures within the flow. The technique is described in "Low Cost Velocity Sensor Based on the Self-Mixing Effect in a Laser Diode", Opto-Electronics Review 11(4), 313-319 (2003) and in "A Simple L2F Velocimeter Based on Self-Mixing of Laser Diodes", 14$^{th}$ Int Symp on Applications of Laser Techniques to Fluid Mechanics, Lisbon, Portugal, 7-10 Jul., 2008. While these methods do not use Doppler shift, one of them mentions that self-mixing diode lasers may be used in Doppler shift velocimeters.

In still another fluid velocity measuring Doppler-shift prior art technique, two laser beams are caused to intersect at a point in the flowing stream and the velocity at that point is determined by the Doppler shift of the scattered light. This technique is disclosed in U.S. Pat. No. 4,026,655. This patent describes the use of this technique in measuring air speed and does not apply it to measuring velocity in an open channel flow carrying reflecting objects.

SUMMARY OF THE INVENTION

Accordingly, it is an object of the present invention to provide at least one of:

A novel apparatus for remotely measuring the direction and flow rate of liquid in an open channel flow with high resolution and precision.

Novel signal processing techniques that reduce noise substantially below the signal level. These algorithms function even though there is no phase coherence between signals returning from separate individual scatterers in the flow passing through the focus of the laser beam.

A method to reduce the contribution from surface-reflected signals in a flow meter.

A novel method for remotely classifying the turbidity of an open channel flow.

A novel technique for avoiding undesirable laser mode-hop instabilities in a velocimeter that can occur at particular temperatures. Such mode-hop instabilities dramatically reduce laser coherence length which can render the sensor inoperable.

A novel technique to distinguish between stable and unstable laser operation based on examination of the Doppler beat frequency spectrum noise levels.

A method for identifying the direction of the flow.

A method for autofocusing the beam within the flow based on flow height measurements from an integrated sensor, such as an acoustic sensor.

A method for efficiently coupling the laser beam energy into and out of the flowing medium.

A laser velocimeter which is robust to environmental effects such as moisture condensation on the optics.

A laser velocimeter which has low power consumption for long-term use at remote locations.

A laser velocimeter that measures velocity at multiple locations across the flow in order to provide a more accurate volumetric flow measurement.

A novel apparatus and method for measuring the flow rate of liquid.

A novel apparatus for remotely determining the direction of flowing liquid.

Novel signal processing techniques that reduce noise substantially below the signal level.

Novel algorithms for detecting signals related to the flowing liquids that function even though there is no phase coherence between signals returning from separate individual scatterers in the flowing stream.

A novel technique for avoiding undesirable laser mode-hop instabilities in a velocimeter.

A novel technique for preventing mode-hop instabilities from dramatically reducing laser coherence length.

A novel technique for preventing mode hop instabilities which can render the sensor in a velocity meter inoperable.

A novel technique to distinguish between stable and unstable laser operation.

A novel technique for distinguishing between stable and unstable laser operation from an examination of the Doppler beat frequency spectrum noise levels.

A method for autofocusing the beam within the flow based on flow height measurements.

A laser velocimeter which is robust to environmental effects.

A novel method for remotely classifying the turbidity of a body of liquid.

A laser velocimeter which is robust to environmental effects.

A novel synergistic relationship between the use of coherent radiation and correlation signal processing techniques to measure flow velocity.

A novel technique using coherent radiation and correlation signal processing techniques to obtain Doppler shift information for measuring flow rate.

A novel method for using self-mixing amplification of backreflections from scatterers below the surface of a flow for enhanced detection in a laser Doppler velocimeter.

In accordance with the above and further objects of the invention, an apparatus for measuring the velocity of an open channel flow of liquid includes a laser diode and an optical system positioned and constructed to focus light from the laser diode to a predetermined focal point within the stream. With this arrangement, a portion of the laser light within the beam focus is backscattered from particulate matter in the flow, travels back along the same path as the emitted light, and is focused back into the laser cavity. This backscattered light, whose frequency has been Doppler shifted by its interaction with moving particles in the flow, is then amplified and mixes with the light in the cavity emitted by the laser. Provided that the backscattered light remains coherent with the laser light in the cavity, it produces an intensity modulation in the intensity of the output beam at the Doppler beat frequency. The depth at which signal data is taken is controlled by the positioning of the focus of the laser beam in the flow since by reciprocity only the Doppler shifted backreflection from the flow at the focus is efficiently coupled back into the laser cavity. A digital signal processor (DSP) is connected to the mixing system to convert the Doppler beat signal into a Doppler beat frequency spectrum. Following the DSP, a microprocessor calculates the speed and direction of the flow at the focal point from the Doppler beat frequency spectrum. Finally, the microprocessor is also programmed to remove any Doppler signal spikes (most probably from surface reflections) that are anomalously strong compared to the average Doppler signals coming from scatterers within the bulk of the flow.

The depth at which signal data is taken in the flow can be controlled via positioning of the focus of the laser beam since a laser Doppler signal is only collected from the focal region of the beam. Because reflections from the surface may not accurately represent the velocity of the bulk flow, the focus is projected into the flow so that signals from features on the surface are greatly reduced. Production of a Doppler signal requires optical coherence of the backscattered signal across much of the surface of the collection lens. With scattered light, such large-scale optical coherence upon the lens is only produced by large laser speckles. Such large speckles are produced only by scatterers in the focus of the laser beam. Since the optical phases of individual speckles projected from the same scatterer vary randomly, when numerous speckles fall on the collection optic, to first order, their beat signals in the laser cancel out. Thus, very little beat signal appears from scatters located outside the beam focus. Large speckles are specific to scatters located in the focal region of the beam; laser speckles projected from scatterers in other beam regions will be quite small, projecting many speckles across the collection lens which result in the production of a negligible laser Doppler signal. Finally, the microprocessor is programmed to remove any Doppler signal spikes (most probably from surface reflections) that are anomalously strong compared to the average Doppler signals coming from scatterers within the bulk of the flow.

One embodiment of the optical system consists principally of a commercially packaged laser diode and an external lens. Within the optical cavity of the laser a diode junction emits highly coherent laser light. The coherent laser light diverges out of the optical cavity towards the external lens. The divergence angle of the beam out of the laser package is set by either the fabrication of the laser diode optical cavity or by a corrective lens embedded inside the laser package. The f-number of the external lens is chosen to match the divergence angle of the coherent light from the laser in order to optimize light collection from the laser. The position of the external lens is chosen to gather as much of the divergent laser light from the optical cavity as possible. The position of the external lens is further adjusted to focus the laser light below the surface of the flowing stream. The position of the focal point in the flow is determined by the distance between the laser diode optical cavity and the external lens according to the lens maker's formula. A small amount of the laser light in the focal region is Doppler shifted as it is scattered back into the laser cavity from particles moving along in the flowing stream. Since these particles are flowing with the stream, their velocity is representative of the velocity of the flowing stream at the focal point. By reciprocity, light scattered from particles within the beam focus in the stream which falls within the acceptance cone of the external lens is coupled back into the laser diode optical cavity by the external lens. This effect aids in discriminating against light scattered from elsewhere in the beam, such as from the surface of the flowing stream. If the Doppler shifted backscattered light remains coherent with the light in the laser cavity the net intensity out of the laser is modulated at the Doppler beat frequency. A window in the optical path, that serves to protect both the laser and the external lens from the environment, must be of sufficient optical quality, e.g. flatness, that it preserves the spatial quality of the beam for efficient operation of the optical system.

To increase the amount of light transmitted to scatterers below the surface, the laser diode is oriented to produce p-polarized light (in the plane of reflection) to make use of Brewster's angle to reduce surface reflections as the beam enters the flow. Still, even with a beam focused in the flow, commonly the raw Doppler signal seen by the photodiode in the laser velocimeter will be below the level from noise sources, such as shot noise due to photodiode current. Overcoming this limitation was key to producing a functional Doppler flow sensor. Signal processing techniques are employed to recover a usable Doppler signature from within this noise. The Doppler signature arises as a series of short pulses, or bursts, produced by scatterers in the flow which pass through the focus of the optical beam. The phase of the Doppler signal varies randomly with each new scattering particle. For processing, the Doppler signal is transformed from the time domain to the frequency domain with a Fast Fourier transformer. The input signal is sampled at a rate that is high enough to accommodate the Nyquist limit of the Doppler frequency from the highest flow rate to be measured. However, even when the signal from the photodiode is subjected to a Fast Fourier Transform (FFT), there is no boost in signal-to-noise ratio since the signals from the scatterers are incoherent with each other and the signal itself is often lost in the vast amount of background noise between Doppler bursts. In one embodiment, the signal-to-noise ratio is increased by processing the signal as a series of short duration FFTs. The duration processed by each FFT is 1× to 2× longer than the transit time of a particle through the focus of the laser beam.

The frequency spectra from all of the FFTs are then averaged together, resulting in a spectrum with an increased signal-to-noise ratio. This resulting averaged spectrum is then used as the final signal.

After a background spectrum is created by defocusing the beam within the flow, pattern recognition algorithms first eliminate peaks common to the signal and background spectra and then examine the remaining peaks to identify the relevant peak in the averaged FFT corresponding to the fluid flow velocity, through the elimination of features such as spikes in the spectra that could be due to surface reflections. With knowledge of both the liquid level and the open channel conduit geometry, which provide the cross-sectional area of the flow, the expected flow rate can be calculated by multiplying the measured velocity value and the cross sectional area of the flow. This value may be further refined by modeling the relationship between the measured velocity value and the average flow velocity.

In another embodiment to determine turbidity, the system microprocessor includes a program that changes the focus point between one depth and another. The variation in the strength of the backscatter signal as the depth is increased correlates with the turbidity of the liquid. The higher the rate of attenuation of backscatter with respect to depth, the greater the turbidity. The principle behind this technique has some similarities to a Secchi disk. A Secchi disk is lowered into a natural body of liquid until its image is no longer visible due to attenuation and scattering of the light from its image. The distance below the liquid surface, known as the Secchi depth, decreases with higher rates of attenuation due to higher levels of turbidity. The microprocessor may be calibrated to provide a scale of turbidity.

To avoid prolonged mode-hop laser instabilities, which arise from slow changes in the temperature of the laser diode, from preventing data collection, in one embodiment the microprocessor causes power to be applied to the laser diode only for short periods of time during which beat signal measurements are taken. Immediately after the laser diode is turned on its temperature changes rapidly for several seconds. During this time the laser tunes rapidly through several stable and unstable operating regions. During analysis data collected during stable operation is processed while that taken during unstable operation is discarded. An added benefit of turning on the laser diode for short periods of time is that it reduces the duty cycle for sensor operation, thereby increasing power efficiency and yielding longer battery lifetimes in remote sensor operations. An alternate method of operation places a small heater band around the laser diode package to shift the temperature of the diode to a stable operating point where it can be maintained without significantly compromising power efficiency.

In a further development of this embodiment, to determine the direction of the flow the laser diode is mounted on a fixture that can be dithered back and forth by less than a millimeter along the direction of the laser beam. Movement of the laser along the beam path, with a projection pointing in the same direction as the flow, lowers the observed Doppler beat frequency while movement of the laser, with a projection in a direction opposite the direction of flow, increases the observed Doppler beat frequency (see FIG. 8 for a full discussion of this process).

DESCRIPTION OF THE DRAWINGS

The above-noted and other features of the invention will be better understood from the following detailed description when considered with reference to the accompanying drawings in which:

FIG. 3 illustrates the positioning of a laser Doppler velocimeter beam waist of diameter D in a flow of nominal velocity, V where the transit time of particles through the beam waist is on the order of time, $T=D/V$.

FIG. 4 shows a representative time trace that might be produced by the system of FIG. 1. Occasional Doppler "bursts" are generated by scatterers passing through the beam waist amidst long periods of background noise where no scatterers are detected.

FIG. 5 illustrates the typical frequency spectrum produced when the FFT is evaluated over long (in comparison to particle transit times through the beam) time intervals.

FIG. 6 pictures a time trace similar to that shown in FIG. 4 except that it is being divided into time intervals that are roughly comparable to the transit time of particles through the beam waist.

FIG. 7 illustrates FFTs taken over each of the short time intervals shown in FIG. 6. When summed together noise in the resultant FFT is reduced by an amount proportional to the square root of the number of samples being averaged.

FIG. 9 is a flow diagram of the preferred embodiment of a process or computer program for determining the volumetric flow rate of a flowing stream.

FIG. 10 is a flow diagram of a subroutine of a process of FIG. 9 of collecting a background spectrum.

FIG. 11 is a flow diagram of a subroutine of a process of FIG. 9 of stepping the laser to a position with respect to the lens that causes focusing at the predetermined distance beneath the surface of the flow stream for automatic focusing.

FIG. 12 is a flow diagram of a subroutine of a process of FIG. 9 of collecting a Doppler signal spectrum.

FIG. 13 is a flow diagram of a subroutine of a process of FIG. 9 of finding a valid Doppler peak in the spectrum.

FIG. 14 is a flow diagram of a subroutine of a process of FIG. 9 of calculating the unsigned Doppler flow velocity.

FIG. 15 is a flow diagram of a process within the process of FIG. 9 of determining the sign direction of the flow.

FIG. 16 is a flow diagram of a subroutine of a process of FIG. 9 of calculating the average volumetric flow.

FIG. 17 is a flow diagram of a subroutine for profiling a flow stream.

DETAILED DESCRIPTION

Figure 1:
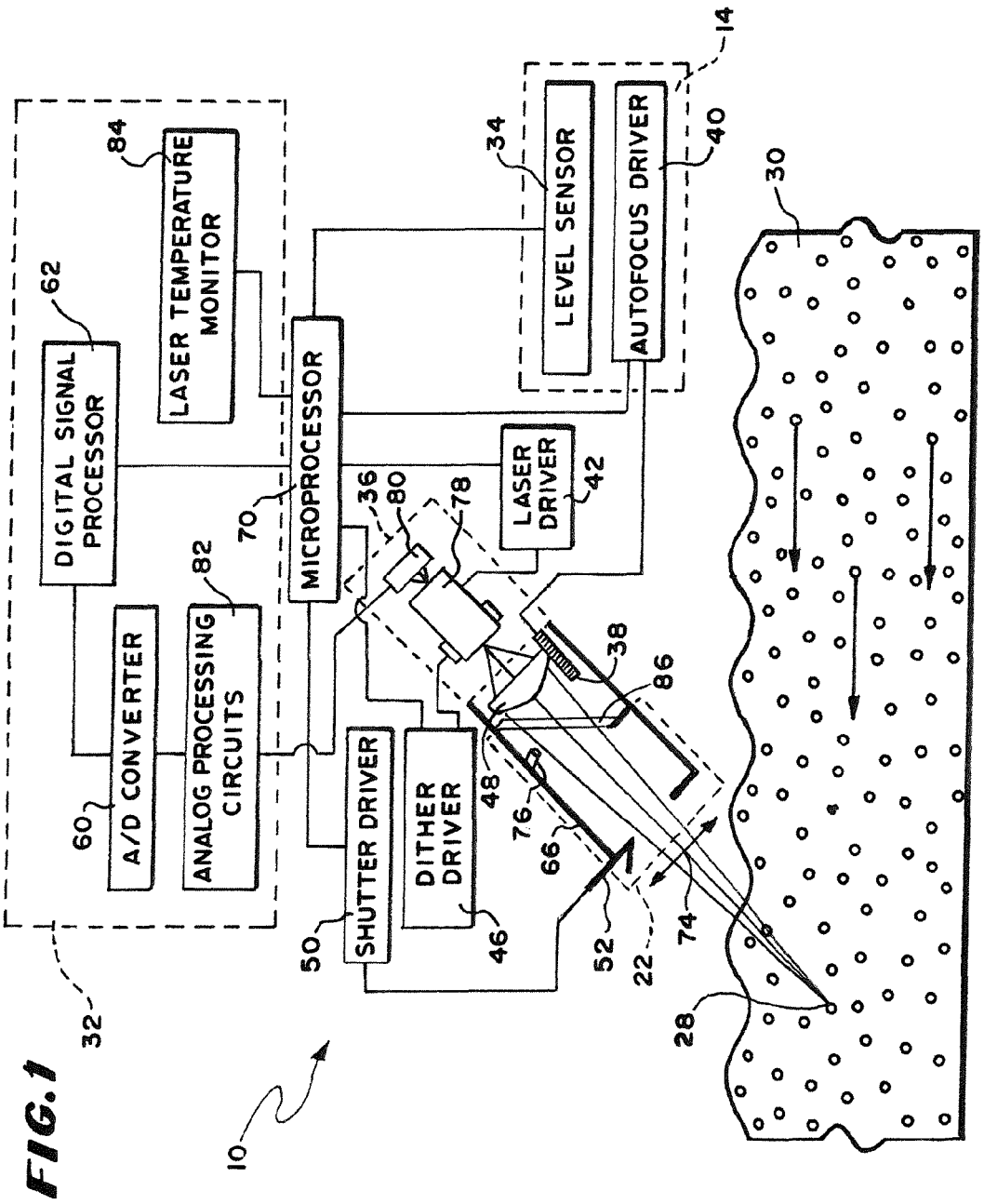
FIG. 1 is a simplified schematic diagram of a system for remotely measuring the flow rate of a fluid stream.

In FIG. 1, is shown a schematic block diagram of a flow meter for remotely measuring the average velocity of an open channel flow, 30. In this specification the words "open channel flow", "flow", "liquid flow", "rate of flow" and "flowing steam" are used from time to time to designate the medium for which the flow meter is used. These words are not intended to be words of limitation as to the nature of the liquid, the rate of which is being measured, and the novel flow meter and are interchangeable when designating the medium characteristics of which are being measured. The flow meter 10 includes as its principal parts a Doppler beat frequency subsystem 32, a laser diode module 36, a microprocessor subsystem and input/output devices 70, a laser temperature and flow stream level monitoring system 14, and a environmental protection system 22. The flow meter uses a laser diode module 36, that contains a laser diode emitter 78 and a photodetector 80 mounted behind the rear facet of the laser. With this combination of parts, the laser diode module 36 transmits a p-polarized beam 74 through the optical system to a location or focus point 28 within the flow stream 30.

The Doppler beat frequency processing subsystem 32 includes analog processing circuits 82, an A/D converter 60, a digital signal processor 62 and a laser temperature monitor 84. The digital signal processor 62 and the laser temperature monitor 84 are in electrical communication with the microprocessor subsystem and input/output devices 70 to supply signals indicating the Doppler beat signal and the laser temperature to the microprocessor subsystem and input/output devices 70. These signals can be used by the microprocessor subsystem and input/output devices 70 to correlate the temperature of the laser diode with stable and unstable periods of operation of the laser diode and to provide information to the operator through the output devices within the microprocessor subsystem and input/output devices 70. The analog processing circuits 82 are in communication with a photodetector 80 within the laser diode module 36 to receive Doppler signals and with the A/D converter 60 to convert the signals to digital form and transmit the digitized Doppler signals to the digital signal processor 62 for FFT evaluation before being sent to the microprocessor subsystem and input/output devices 70 for further processing.

To avoid operating temperatures at which the diode laser experiences prolonged mode hop instabilities data is taken immediately after the laser is turned on. As the laser approaches thermal equilibrium it passes through several regions of stable and unstable operation. Data recorded during this period is examined by the microprocessor 70 which, based on the characteristics of the noise levels, distinguishes between stable and unstable operation. After the laser reaches thermal equilibrium and the measurement is done, it is turned off until the next measurement cycle. Periodic measurement cycles reduce the sensor duty cycle, thereby reducing battery drain, saving power, and enabling longer unattended remote operation for the sensor.

The beam focusing system 14 includes a level sensor 34 and an autofocus driver 40 each of which communicates with the microprocessor subsystem and input/output devices 70. The microprocessor subsystem and input/output devices 70 includes a program that controls the autofocus driver to position the focus of the beam at a predetermined depth that may be recorded in memory. In this specification, the words "predetermined depth" mean the depth of the focus of the transmitted laser beam. The predetermined depth is chosen in accordance with the purpose of the measurement. However, in any case, the focus is at a depth sufficient to avoid spurious contributions to the velocity measurements from the surface and close enough to the surface of the flowing stream 30 so that p-polarized light of significant intensity reaches light scatterers below the surface. Such backscattering objects are referred to herein as backscatter material and may include any material that backscatters light including for example colloidal suspensions as well as solid material. The words, "significant intensity" mean an intensity that permits measurement of velocity of the movement of the flowing stream within a reasonable margin of error. Hereinafter, the depth of the focus that meets the above criteria is referred to as a predetermined depth. The reasonable margin of error depends on the use to be made of the measurements. The meaning of the words "reasonable margin of error" in this specification depends on the use to be made of the measurements. It is an error that permits the intended use of the measurement, e.g. to determine if a flow of liquid will overload a sewer system.

The beam from the laser is automatically focused to a point 28, below the surface of the flow by a lens 48, attached, in one embodiment of the system design, to an autofocus driver 40, whose movement is controlled by the microprocessor 70, based on level measurements provided by a conventional level sensor 34, such as an ultrasonic time-of-flight sensor. Focusing below the surface effectively eliminates spurious contributions to the velocity measurement from surface reflections. In this specification, the words "spurious contributions to the velocity measurements" mean that reflections from light scatters on the surface can give inaccurate velocity readings and are hence removed from the data used for velocity calculations. To maximize the amount of light transmitted below the surface, the linearly polarized laser diode is oriented to make use of the Brewster's angle reflection property for p-polarized light 74 as it enters into the flow. In this specification, the words, "Brewster's angle" shall mean substantially at the Brewster's angle and the words "substantially at the Brewster's angle" shall mean at an angle permitting minimal reflection loss at the surface of the flow. As an example, for <1% surface reflection from p-polarized light incident on flowing liquid Brewster's angle is in the range of 42 to 63 degrees.

In the preferred embodiment laser light that is Doppler shifted and backscattered from particles moving in the flow 30, returns to the laser 78, where it mixes with the original laser beam to produce a Doppler beat signal that is picked up by the photodetector at the rear facet of the laser in a self-mixing process that was first described in "Laser Doppler velocimeter using the self-mixing effect of a semiconductor laser diode", Appl. Opt. 25, 1417-1419 (1986). To determine the direction of the flow the laser diode is dithered 46 along the beam path during a measurement (see FIG. 8 for a detailed description). A number of methods, such as magnetic or piezoelectric approaches, can be used to dither the very small laser diode unit.

In this embodiment the analog Doppler signal is processed by the Analog Processing Circuits 82, and is then converted from analog-to-digital by an A/D Converter, 60. The signal-to-noise ratio of the Doppler beat spectrum is enhanced by the square root of the number of samples by summing together a series of Fast Fourier Transform (FFT) spectra produced by the digital signal processor (DSP) 62 from dividing the time trace into sequential time segments whose duration corresponds roughly to the transit time of scattering particles in the flow passing through the beam focus (see discussion of FIG. 3). Next, a background spectrum is created using the same process outlined above but with the beam in the flow defocused. Pattern recognition algorithms in the microprocessor 70, first eliminate peaks common to the signal and background spectra and then examine the remaining peaks; comparing their linewidths, shapes and locations with prior recorded flow data to help identify the peak in the averaged FFT that corresponds to the bulk flow rate. Knowledge of the open channel conduit geometry and flow level, used with the flow rate model, can provide an estimate of the flow velocity that will aid in finding the Doppler signal peak in the spectrum.

To protect the optics from the environment several technologies can be employed. A tube 66 whose inner surface is coated with a hydrophilic material intercepts moisture entering the tube and draws it away from the glass window 86 so that it runs back down the wall of the tube and out the open end while a short air blast from a compressed air source 76, clears any remaining condensation or solid debris from the optics before collecting data. The flat optical quality window mounted at the Brewster's angle 86 protects the sensitive and expensive focusing optics 48 and focusing mechanism 38 from moisture and corrosive environmental gases. Lastly, an optical or electronic shutter 52 (while the shutter 52 is shown as a mechanical shutter, in practice it should have speed of opening and closing that is sufficient to provide the high sampling rate required and will be an optical or electrical shutter) at the end of the coated tube 66 is only open for the brief periods during which data is collected to further limit exposure of the optics to the outside environment.

In addition to providing basic flow measurement this device can be configured to provide several other useful bits of information about the flow. By collecting data sequentially at different depths the turbidity of the flow can be estimated from the change in intensity of the backscattered Doppler signal with depth. Volumetric flow in the open channel can be extrapolated from a single point velocity measurement at a known location in the flow given a knowledge of flow height in the channel and channel geometry. Volumetric flow can be more accurately determined by measuring the velocity at multiple locations within a cross-section of the flow.

Figure 2:
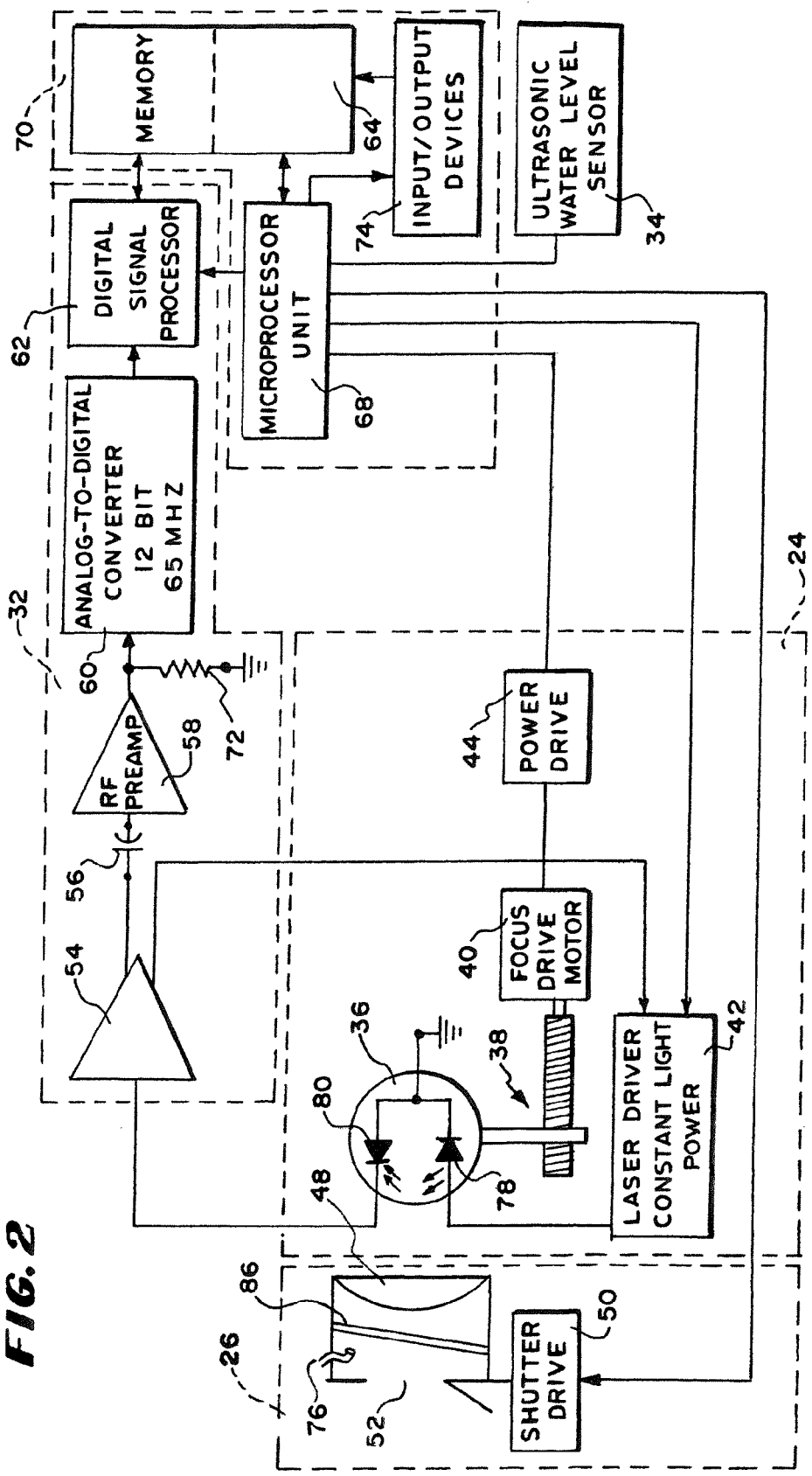
FIG. 2 is a schematic block diagram of the optoelectronics used in the flow meter of FIG. 1.

In FIG. 2 is a schematic block diagram of the basic optoelectronic components found in one preferred embodiment of the current invention for remotely measuring average flow in an open channel. The device contains a self-mixing laser subsystem 24, an optical subsystem 26, a Doppler beat frequency processing subsystem 32, a level sensor 34 and a microprocessor subsystem 70.

FIG. 2 also includes a schematic drawing of the Doppler shift frequency processing subsystem 32 shown in FIG. 1 as a block diagram. It includes a pre-amplifier 54, a blocking capacitor 56, an RF pre-amplifier 58 connected to an analog-to-digital converter 60 which in turn is connected to a digital signal processor 62. Signals from the laser diode 36 generated in response to backreflected light are passed through a buffer amplifier 54 before being AC-coupled through blocking capacitor 56 to the input of an RF pre-amplifier 58. The pre-amplifier 58 applies the signal through voltage dropping resistor 72 to the analog-to-digital converter 60. Signals from the analog-to-digital converter 60 are applied to the digital signal processor 62 which performs a series of FFT operations on the data and then sends the resulting spectrum to the memory 64 and to the microprocessor unit 68 within the microprocessor subsystem and input/output devices 74.

The self-mixing laser subsystem 24 includes the laser diode module 36, the lens position adjustment mechanism or screw drive 38, the focus drive motor 40, the laser driver constant light power unit 42 and the power drive 44. The laser diode module 36 transmits light to the focus and receives backscattered light. It mixes the transmitted light frequency and the backscattered light and provides a Doppler beat signal to the Doppler beat frequency processing subsystem 32 to which it is electrically connected. The lens position adjustment mechanism 38 moves the diode module with respect to the optical subsystem 26 to focus the beam of light. The power drive 44 receives signals from the microprocessor subsystem and input/output devices 70 that sets the location or series of locations of the focus and applies the required power to the focus drive motor 40 to which it is electrically connected to position the laser diode module 36 accordingly.

During a flow measurement the microprocessor communicates with the level sensor 34 to determine the flow level in the open channel. In this embodiment the microprocessor commands the focus drive motor 38 to position the diode laser module 36 to focus the laser beam some depth below the surface of the flow. Next the shutter 52 is opened, an air blast 76 clears the flat optical quality window 86, the diode laser 78 is powered on while several seconds of beat signal, created by Doppler shifted backscattered light from the flow mixing with laser light in the cavity, is sent by the photodetector 80 to the Doppler beat frequency processing subsystem 32. In another embodiment, an ultrasonic or electromechanical vibrator attached to the window could also be used to clear the window.

The processed Doppler frequency spectrum is then stored in the microprocessor memory 64. The microprocessor then moves the laser module 36 to defocus the laser beam in the flow and a background frequency spectrum is stored in the microprocessor memory. Next the processor compares the signal and background spectra to eliminate peaks common to both spectra. The remaining peaks are examined with a customized pattern recognition algorithm in order to identify the peak in the FFT spectrum that corresponds to the fluid flow velocity. From the effect of the dither on the identified peak the direction of flow relative to the measuring system can be determined (see FIG. 8). Laser dithering can also be used to identify or confirm peaks in the frequency spectrum as Doppler signal from the flow stream since their frequencies will be red-shifted (increased) or blue-shifted (decreased) accordingly; whereas, noise peaks will be unaffected.

FIGS. 3-7 illustrate a preferred method for increasing the signal-to-noise ratio of the backscattered Doppler beat signal obtained from an open channel fluid flow by self-mixing in a diode laser. Solid material flow produces a continuous, coherent Doppler beat signal which, when converted to the frequency domain by a Fast Fourier Transform, yields a strong peak in the frequency spectrum that corresponds to the speed of the material flow. However, when backscattering from particles 132 in an open channel flow 30 such as that pictured in FIG. 3 are monitored the situation is very different. A series of short Doppler beat signal bursts (134 in FIG. 4) are observed by the photodetector 80 as particles in the flow 30 transit the beam focus 28 and backscatter light into the diode laser. The duration of these Doppler beat signal bursts is approximately T=D/V, where D is the diameter of the beam focus in the flow and V is the speed of the flow.

The FFT of a long time sample such as that shown in FIG. 4 produces no clear Doppler beat frequency peak (FIG. 5) as either the beat signal bursts are so infrequent that their signal is lost in the background noise or the incoherent phasing of succeeding bursts leads to no net improvement of the Doppler beat signal.

FIGS. 6-7 show one preferred method that greatly increases the signal-to-noise ratio of a Doppler beat frequency measurement for open channel flows. The time trace in FIG. 6 is identical to that shown in FIG. 4 except that it is divided into segments of time (139A-139J), T, that correspond approximately to the transit time of particles through the beam focus in the flow. Taking an FFT of each one of these short time segments produces a series of frequency spectra (140A-140J) that when summed together produce a spectrum with a strong Doppler beat frequency peak 143. Summing together a large number of FFTs in this way improves the SNR of the resultant FFT by an amount that is proportional to the square root of the number of FFTs in the summation.

Furthermore, in this process the incoherent phasing of signals from different scatterers does not act to degrade the resultant FFT. An additional improvement in SNR can be made by eliminating any segments that have unusually large amounts of noise such as those created when the laser is becoming unstable prior to mode hopping.

Figure 8:
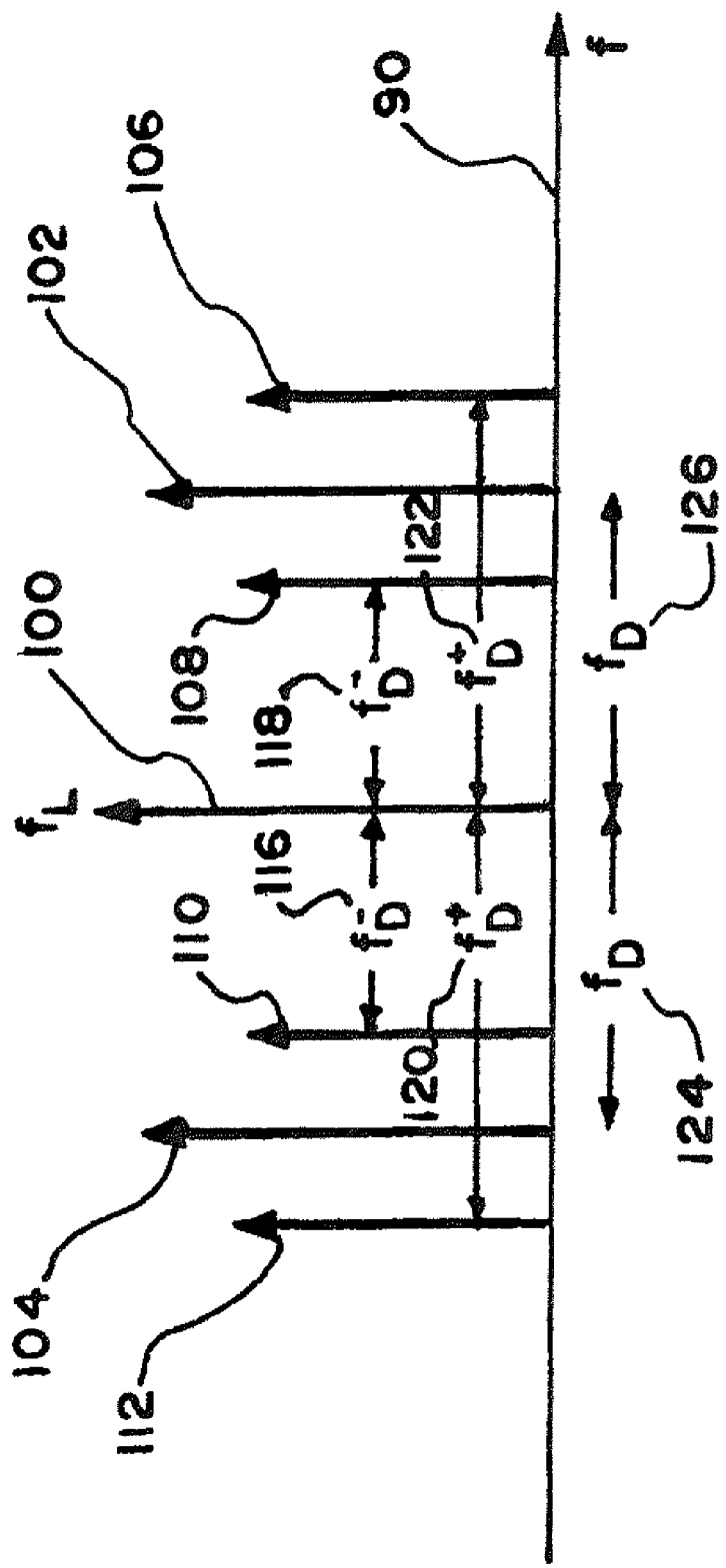
FIG. 8 illustrates the process by which the direction of flow is determined by dithering (+/−) the position of the laser diode during a Doppler measurement.

FIG. 8 illustrates how adding a small (<1 mm) back-and-forth motion (dither) to the laser diode along the beam path permits one to determine the direction of fluid movement in an open channel flow. When a Doppler shifted, backreflected beam from particles in the flow moving towards (102) or away (104) from the apparatus is mixed with the original laser beam frequency (100) in the laser cavity a Doppler beat signal $f_D$ is produced. If the beat signal is very strong it can be observed directly in the time domain as a sawtooth waveform whose positive or negative slope is determined by the direction of flow as described in "Laser Doppler velocimeter using the self-mixing effect of a semiconductor laser diode", Appl. Opt. 25, 1417-1419 (1986). However, if the backreflected beam is very weak then the procedure outlined in FIG. 8 is required to determine the direction of the flow. Since only the fundamental frequency in the beat spectrum is observable, flow towards or away from the apparatus will yield the same peak at $f_D$ in the beat frequency spectrum. Without additional information it is not possible to determine the direction of flow from the Doppler beat frequency spectrum. One method of determining the flow direction is to apply a small (<1 mm) back-and-forth motion (dither) to the laser diode along the laser beam path during a measurement at a speed that is sufficient to shift the Doppler beat frequency by an easily observable amount (for example, 10-50 kHz). The change in the Doppler beat signal is different depending on the direction of fluid flow. For flow towards the apparatus (102) the forward stroke of the dither increases the beat signal to $f_D^+$ (106) while the backward stroke of the dither decreases the beat signal to $f_D^-$ (108). For flow away from the apparatus (104) the forward stroke of the dither decreases the beat signal to $f_D^-$ (110) while the backward stroke of the dither increases the beat signal to $f_P^+$ (112). A further benefit of this dithering process is that it can be used to confirm no flow (zero velocity) conditions, which otherwise would result in no Doppler beat signal and thus no output signal due to the AC coupling (blocking capacitor 56) of the electronic circuitry (FIG. 2).

In FIG. 9, there is shown a flow diagram 144 of the preferred embodiment of a process or computer program for determining the volumetric flow rate of a flowing stream having the step 146 of collecting background spectrum, the step 148 of automatically focusing the laser light below the surface of the flowing stream, the step 150 of collecting a Doppler spectrum while keeping the laser emitter stationary, the step 152 of finding the Doppler peak in the above collected Doppler spectrum and returning its corresponding Doppler frequency shift, the step 154 of determining unsigned Doppler flow velocity, the step 156 of determining signed direction of the flow, and the step 158 of calculating volumetric flow and gathering data. Each of these steps is described in greater detail below.

In FIG. 10, there is shown a flow diagram of the process 146 of collecting a background spectrum having the step 162 of keeping the shutter closed or focusing the laser to infinity, the step 164 of turning on the laser, the step 166 of collecting N consecutive, equally time spaced signal data points at a sufficiently high sampling rate frequency, the step 168 of dividing the sample into transit-time length segments, the step 170 of converting the above transit-time signal data into a set of frequency domain spectra by Fast Fourier Transform (FFT), the step 172 of rejecting poor quality spectrum and retaining good quality spectrum that does not include spectra recorded during times of laser instability caused by mode hopping, the step 174 of continuing to acquire more good quality spectra until K, a sufficiently large number, of good spectra has been acquired, the step 176 of summing the K good quality spectra into a single spectrum and storing this spectrum as a background spectrum, and the step 178 of turning off the laser. The background spectrum is obtained to avoid basing the velocity readings on noise that could otherwise be misinterpreted as a Doppler shift but is actually independent of focusing or shining the laser light into the flowing stream. The background signal contains possible electrical signals that do not originate from backscattering of the laser light from the flowing stream. The collection of background spectra avoids misinterpreting as signals sufficiently strong electrical signals that are not caused by scatterers in the flow stream, and thus should be considered noise.

In FIG. 11, there is shown a flow diagram of the process 148 of automatically focusing the laser light in a predetermined distance beneath the surface of the stream having the step 180 of measuring and recording the height or depth of the flowing stream using some form of level sensor, such as an ultrasonic time-of-flight sensor, the step 182 of using the angle value, typically but not limited to 45°, between the laser beam axis and the flowing stream level, the above stream height value from step 180 and information about the pipe-channel geometry to calculate the distance between the lens and the desired focal point within the flowing stream, the step 184 of using the Lens Maker's Formula and focal length of the lens to calculate the required distance between the laser emitter and the lens, the step 186 to home the position of the laser emitter and the step 188 of positioning the laser emitter the required distance away from the lens. The stream height value from step 180 is recorded and used elsewhere in the data collection and analysis. In the preferred embodiment, the laser emitter is moved in order to adjust the required distance between the lens and laser; however, for the purpose of focusing, the lens could be moved also to adjust this required distance. Furthermore optical-quality mirrors could be inserted between the laser emitter and lens to adjust their effective optical distance, but this would add further complexity to the system.

In FIG. 12, there is shown a flow diagram of a process 150 for collecting signal and spectrum comprising the steps 190 of opening the shutter, clearing the window and turning on the laser, the step 192 of collecting N consecutive, equally time-spaced signal data points at a sampling rate that is high enough to accommodate the Nyquist limit of the highest Doppler frequency to be measured, the step 194 of dividing the sample into transit-time length segments, the step 196 of converting the transit-time signals into frequency domain spectra by Fast Fourier Transform (FFT), the step 198 of rejecting poor quality spectra and retaining good quality spectra that does not include measurements taken during laser instabilities caused by mode hopping, the step 200 of continuing to acquire more signals and spectra until K number, i.e. a sufficiently large number, of good quality spectra have been acquired, the step 202 of summing the K good quality spectra into a single spectrum and storing this spectrum as a Doppler spectrum, and the step 204 of turning off the laser and closing the shutter. In this fashion, the signal is collected during periods of time when the laser is stable and not hopping from mode to mode. To further enhance the signal-to-noise ratio, the step 198 could also reject spectra, that have been determined not to contain any contributions from the Doppler-shifted, backscattered laser light. In this process, the laser emitter is kept stationary with respect to the lens.

A collected spectrum should be rejected based on its overall noise level. A spectrum collected during unstable operation of the laser has a significantly higher noise level than a spectrum collected during stable laser operation. In general, spectra collected during stable laser operation have minimum noise levels. The noise level of a spectrum can be estimated by averaging the baseline values at several frequencies in the spectrum other than at the frequency of the Doppler shift. The noise level of a spectrum can also be estimated by summing together the power or intensity values for each frequency over the entire spectrum, since the Doppler signal is small compared to the total noise. Finally the power current drawn by the RF preamplifier (FIG. 2, 58) during the signal acquisition of a spectrum is also indicative of the noise level of that spectrum. In this specification or claims, the words "noise level floor" may be used from time to time. In this specification, these words mean the strength of the signal created from the sum of all the noise sources and unwanted signals. While the noise floor and peaks are used to distinguish between unstable and stable signals, other comparisons are possible such as the RMS of the noise and the peak noise signals.

In FIG. 13, there is shown a flow diagram of the process 152 of identifying the peak in the spectrum obtained in process 150 due to the Doppler beat signal having the steps 210 of using the previous velocity measurement or the result from a Flow modeling equation, to aid in searching the Doppler velocity spectrum for a peak within the neighborhood of the estimated velocity value bound by a set of tolerance bands, or the step 212 of searching the Doppler spectrum directly using a first-derivative slope filter, such as a Savitzky-Golay filter or any suitable finite-difference technique, for the occurrence of the spectral curve slope increasing above a predetermined slope threshold value setting, indicating the start of a peak in the spectral curve, the step 214 of ensuring that the peak found in either step 210 or step 212 has a width at least as wide as the predetermined minimum peak width value setting, the step 216 of ensuring that the peak does not also occur in the background spectrum obtained in process 146 (FIG. 10), the step 218 of continuing to search for another peak in the Doppler spectrum by either step 210 or step 212, if the first peak does not satisfy the width criterion or is also found in the background spectrum, the step 220 of taking the peak frequency as the Doppler frequency value when a valid peak has been found; otherwise, repeat the Doppler spectrum collection described in process 150, and finally the step 222 of returning the value of the Doppler frequency.

In FIG. 14, there is shown a flow diagram of the process 154 of calculating the unsigned Doppler flow velocity value from the Doppler frequency value returned from process 152 having the steps 230 of using the angle value with respect to the flowing stream level and the Doppler formula to calculate the velocity of the flowing stream from the Doppler frequency value, and the step 232 of returning the Doppler velocity unsigned value as the magnitude of the velocity for the flowing stream.

In FIG. 15, there is shown a flow diagram of a program 156 which provides the software processes for determining the sign, or the direction of flow, of a flowing stream. This program includes the process 240 of automatically focusing the laser light into the flow stream below the surface at a predetermined level, similar to process 148 (FIG. 11), the process 242 of collecting a Doppler spectrum while moving the laser emitter towards the lens, similar to process 150 (FIG. 12) which instead keeps the Laser emitter stationary, the process 244 of finding a Doppler peak in the "Toward" spectrum, similar to process 152 (FIG. 13), the process 246 of automatically focusing the laser light again, since the laser emitter was moved in process 242, the process 248 of collecting a Doppler spectrum while moving the laser emitter away from the lens, the process 250 of finding the Doppler peak in the "Away" spectrum. The "Toward" spectrum is a Doppler spectrum that has been collected while moving the laser emitter towards the Lens; whereas, the "Away" spectrum is a Doppler spectrum that has been collected while moving the Laser emitter away from the Lens. Typically the Doppler spectrum is collected while the Laser emitter remains stationary, as in process 150 (FIG. 12), in determining the unsigned Doppler flow velocity value. The descriptors "Toward" and "Away" are also used for corresponding values, such as the Doppler frequency value. This program 156 continues with the steps 252 of comparing the "Toward" Doppler frequency value and the "Away" Doppler frequency value with each other and assigning a positive value to the sign direction of the flow when the "Toward" value is greater than the "Away" value; otherwise, it assigns a negative value to the sign direction, and the final step 254 of returning the sign direction value of the flow. A positive sign direction value indicates a flow toward the velocimeter; whereas, a negative sign direction value indicates a flow away from the velocimeter.

The principle behind this concept is based on the fact that the motion of the laser emitter, which serves as both transmitter and receiver of the electromagnetic wave, affects the relative velocity between the laser and the flowing stream, which in turn affects the Doppler frequency. Moving the laser emitter in the same direction as the flow will reduce their relative velocity and corresponding Doppler frequency. Moving the laser emitter in the opposite direction of the flow will increase their relative velocity and corresponding Doppler frequency. Since the direction of the laser motion is known, the direction of the flow can be deduced from the Doppler frequency change. Assigning a positive value to flow toward the velocimeter and negative value to flow away from the velocimeter is arbitrary.

In another embodiment of this concept, the laser emitter could be dithered towards the lens while collecting N time signal data points for the first FFT, and the laser emitter could than be dithered away from the lens while collecting N time signal data points for the second FFT. The time duration needed to sample N time signal data points at an adequate sampling rate would be short. The laser would only move a very short distance for each dither, and thus would not change the focal point significantly. Also with the laser emitter being dithered back and forth for alternating prepared data segments, the laser need only be automatically focused once. Furthermore, the laser emitter could be moved by a piezoelectric or a magnetic translator.

In another concept, the direction of the flow may also be determined by rapidly increasing or "chirping" the emitted laser light frequency instead of physically moving the laser emitter. A rapid increase or "chirp" in emitted laser light frequency can be achieved by either ballisticly heating the laser diode or rapidly increasing (ramping) its electrical driving current. Initially the emitted laser light has a frequency $f_0$. Since the laser diode is being chirped, the laser frequency will be $f_0+d$ by the time the Doppler-shifted, backscattered light returns. This returned light will either have a frequency of $f_0+w$ for flow toward the laser emitter and velocimeter or a frequency $f_0-w$ for flow away from the laser emitter and velocimeter, where w is the Doppler frequency shift. This returned light will now mix with the new laser frequency $f_0+d$ giving either a beat frequency d+w for flow toward the velocimeter or a beat frequency d−w for flow away from the velocimeter. As long as the value d is larger than the value w, the values d+w and d−w will both be positive. The offset frequency d resolves any ambiguity due to measuring only the magnitude of the velocity.

Both concepts are intended to resolve the flow direction of the stream; however, both concepts can be used to confirm a no flow condition. In the case of no flow, the stream velocity would be zero and the corresponding Doppler frequency shift would also be zero. Due to the electrical circuitry of the velocimeter (e.g. AC-coupling of the signal), a Doppler frequency shift of zero is the same as no Doppler signal. A no signal event could be caused by either a zero-velocity liquid flow condition or no scattered light from the liquid or a break in the circuitry. Both concepts can be used to resolve this ambiguity.

In FIG. 16, there is shown a flow diagram of the process 158 of calculating the volumetric flow having the step 260 of calculating the cross-sectional area of flowing stream using the stream height value and knowledge of pipe geometry, the step 262 of calculating the volumetric flow value from the cross-sectional flow area, the unsigned Doppler flow velocity value and the signed Direction of the flow, the step 264 of determining the average volumetric flow value from use of an industry accepted method such as the average velocity being 90 percent of the maximum velocity value as measured near the surface of the flowing stream or profiling the stream at various depths and locations, forming a grid of focal points, below the surface of the stream by either shifting the laser focal point toward and away from the lens along the axis of the light beam (FIGS. 20 & 21) or shifting the laser focal point perpendicularly from the light beam, side to side, (FIGS. 18 & 19) and the step 266 of using the above average volumetric flow value to optimize the flow modeling equation parameters at a particular site for better estimates in future measurements as in a learning process.

In FIG. 17, there is shown a flow diagram of a process 270 for using the laser light backscattered from the focal point or points below the stream surface with reduced light reflection from the surface of the flow stream to determine a rate of flow of the flowing stream from a grid of focal points or to determine the mean or average velocity of the flow stream having the steps 272 of blocking or removing at least some of the surface reflections from the signal used to determine Doppler velocity of the flow stream, the step 274 of using the laser light scattered back from a grid of focal points covering a substantial area to determine the average volumetric flow of the stream or the step 276 of using the laser light scattered back from a single focal point to determine a flow velocity of the flowing stream at the focal point and/or the mean or average velocity of the flow stream and calculating the volumetric flow rate.

Figure 18:
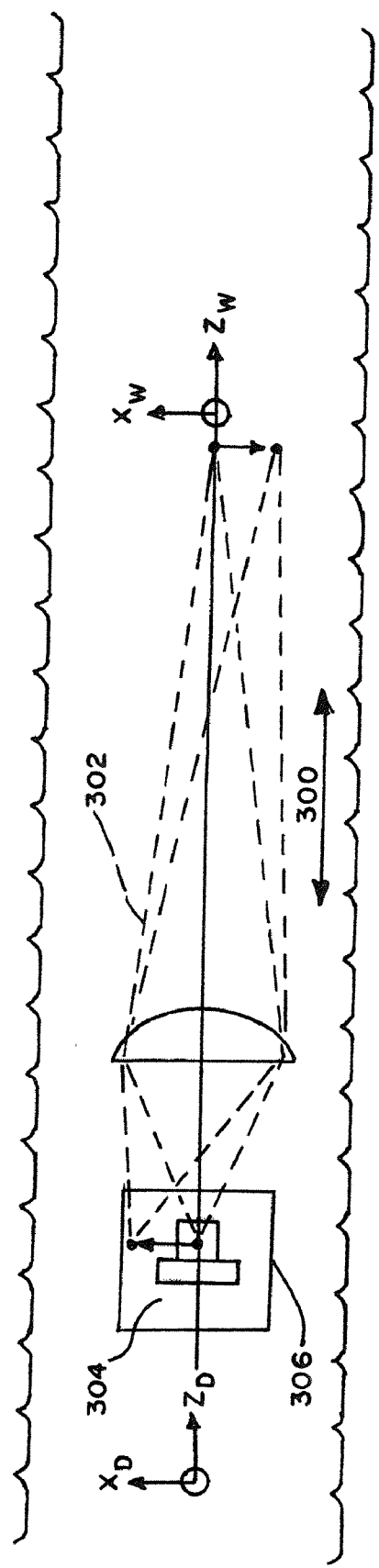
FIG. 18 is a top view of a sketch of the basic optical system showing how shifting the laser diode sideways (perpendicular to the beam path) also changes the position of the focal point within the flowing stream from side-to-side.
Figure 19:
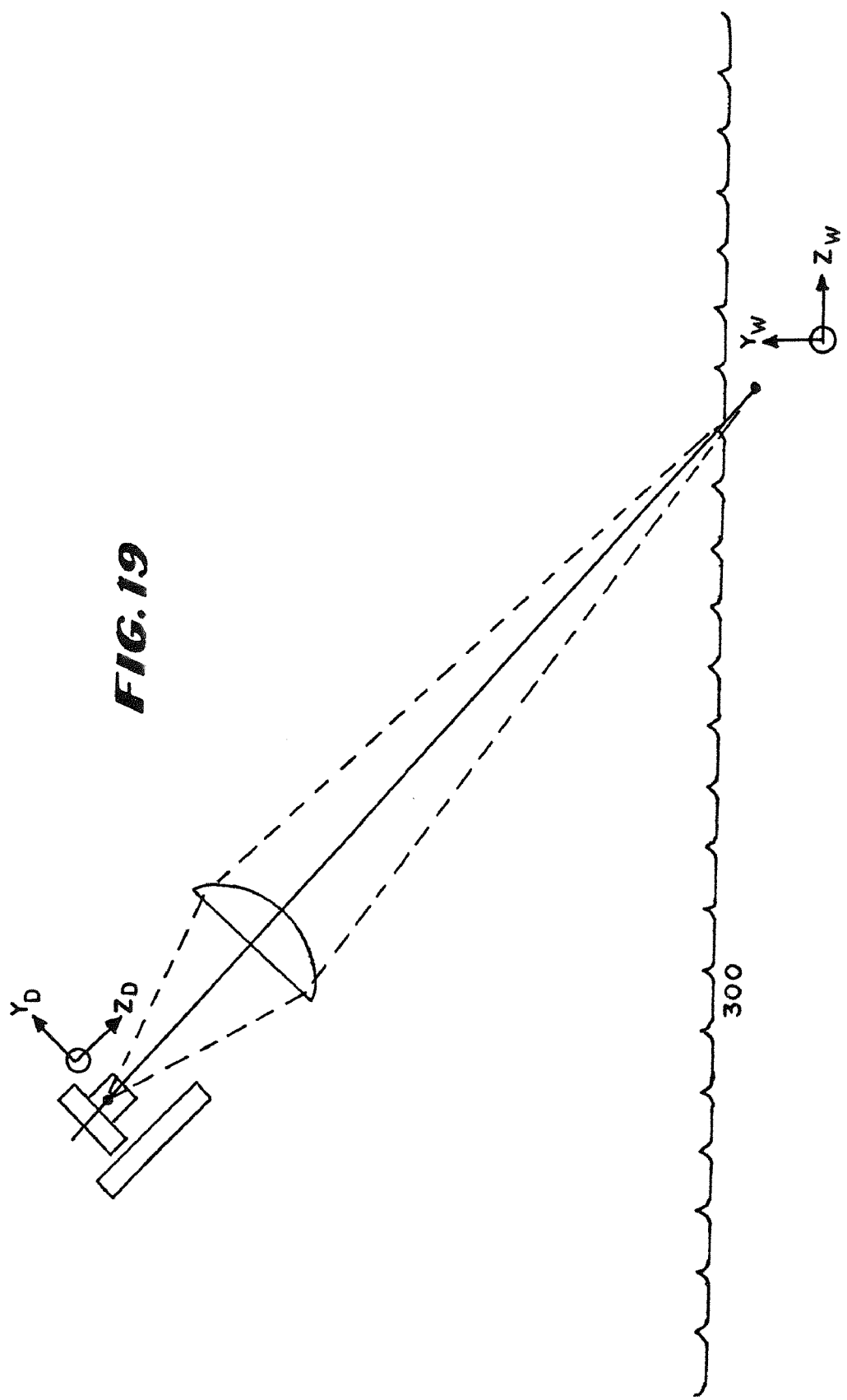
FIG. 19 is a side view of the sketch in FIG. 18.
Figure 20:
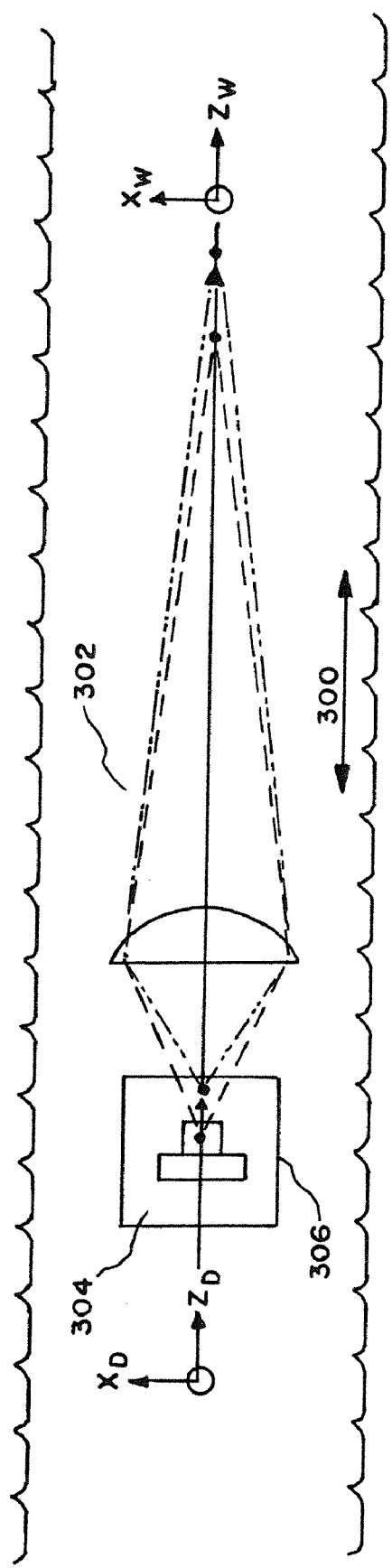
FIG. 20 is a top view of a sketch of the basic optical system showing how shifting the laser diode along the light beam axis also changes the position of the focal point within the flowing stream along the beam axis.
Figure 21:
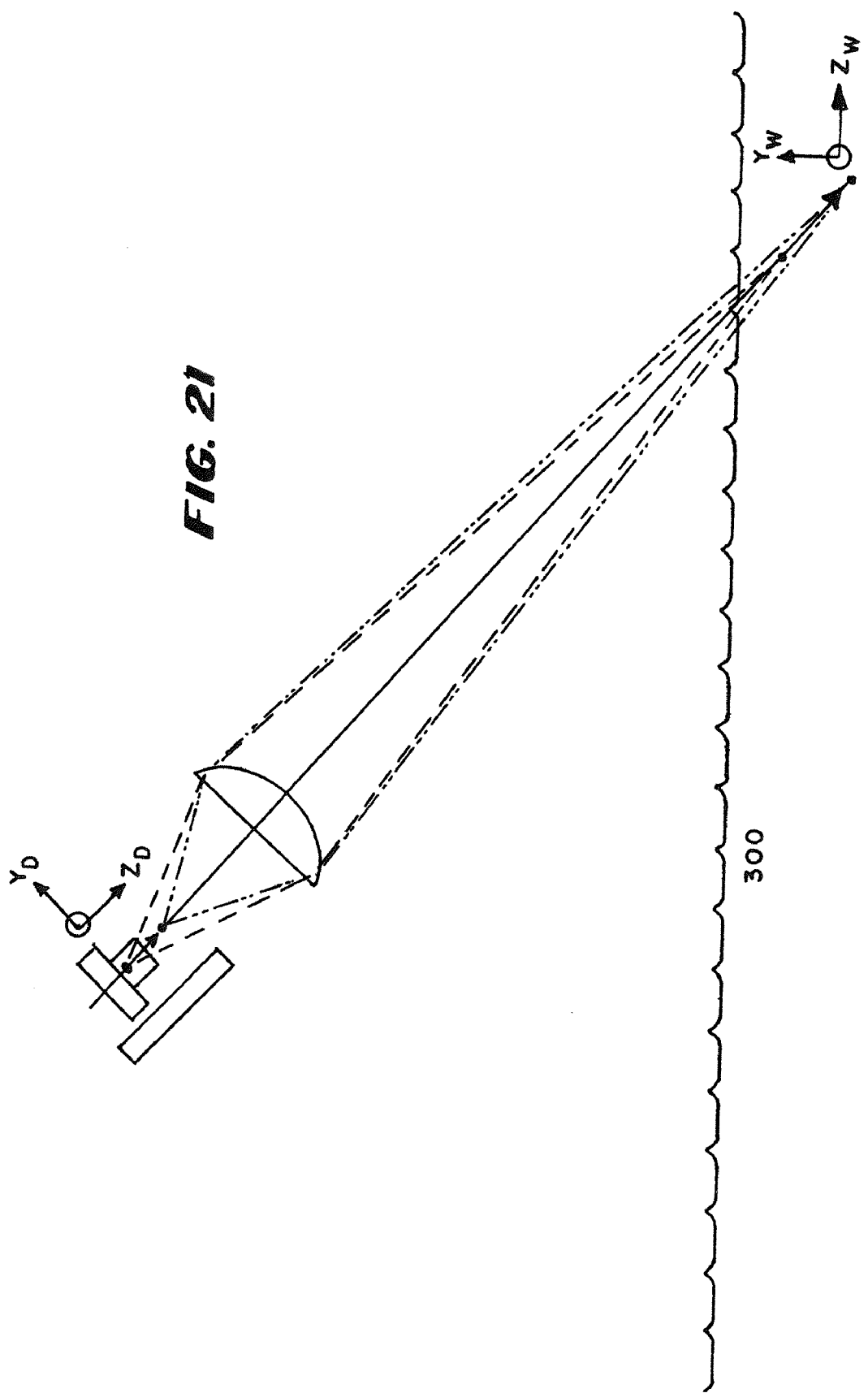
FIG. 21 is a side view of the sketch in FIG. 20.

In FIG. 18, there is shown the top view of the basic optical system illustrating how shifting the position of the laser diode (304) sideways orthogonal to the beam path with a translating mechanism (306) also changes the position of the focal point within the flowing stream (300) from side-to-side along the width of the stream. In FIG. 19, there is a side view of the same illustration in FIG. 18. In FIG. 20, there is another top view of the basic optical system illustrating how shifting the position of the laser diode (304) along the light beam axis with a translating mechanism (306) also changes the position of the focal point within the flowing stream (300) along the light beam axis. In FIG. 21, there is a side view of the same illustration in FIG. 20. FIGS. 18 and 19 illustrate how the laser diode should be moved to change the position of the focal point along the width of the flowing stream so as to measure flow velocities at various points along the width of the stream. FIGS. 20 and 21 illustrate how to move the laser diode so as to measure flow velocities at various depths below the surface of the flowing stream. A combination of these two techniques allows the velocimeter to measure flow velocities over a grid of points covering a cross-section of the flow stream. These measurements taken over the cross-section of the stream can better estimate its average flow velocity or obtain its flow velocity profile.

There are several techniques that may be used together or separately to reduce the deleterious effects of surface reflections on the calculation of volumetric rate of flow of a flow stream. One technique that could be used in software is based on the fact that surface reflections are brighter than scattering within the bulk of the flowing stream. Also surface reflections are from surface bubbles, ripples or other floating objects. These objects are macroscopic, i.e. easily visible by the unaided human eye. Due to their larger size, they are less affected by Brownian motion or local turbulence than microscopic particles, which contribute to the turbidity of the flowing stream and thus serve to scatter the laser light within the bulk of the flowing stream. Surface objects have a significantly narrower velocity distribution than the turbidity-causing, microscopic particles. Due to brighter reflections and narrower velocity spread, surface reflections give sharp, intense Doppler peaks in the spectra. They appear as sharp, intense spikes in the spectra; whereas, the Doppler signal from the bulk flow appears as broad, weaker peaks. Rejecting sharp spikes in the spectra by software further reduces the influence of surface flow on the velocity measurement.

As can be understood from the above description, the velocimeter of this invention has several advantages, such as: (1) not being subject to inaccuracies inherent in measurements of surface velocity, and of detecting a signal when there are few suitable reflectors on the surface; (2) it avoids prolonged time periods during which data collection can not be made because of mode-hop laser instabilities; and (3) it can be used to confirm no flow (zero velocity) conditions by distinguishing no flow conditions from a circuit break which otherwise would result in no Doppler beat signal and thus no output signal due to the AC coupling of the electronic circuitry.

Although a preferred embodiment of the invention has been described with some particularity, it is to be understood that the invention may be practiced other than as specifically described. Accordingly, it is to be understood that, within the scope of the appended claims, the invention may be practiced other than as specifically described.

What is claimed is:

1. An apparatus for noncontact open channel fluid flow measurement comprising:
   a laser; and
   an optical system, the optical system and laser being positioned and constructed to focus light from the laser to at least one predetermined effective focal point within the flowing stream and to return back scattered light from scatterers at the effective focal point within the flowing stream to a system for obtaining a Doppler beat signal from light generated by the laser and the back scattered light; and
   at least one system for protecting the optical system from an environment, said at least one system for protecting the optical system from the environment includes at least one of a long tube having an inner surface that is coated with a hydrophilic material that draws moisture away from optics in the apparatus; a system that provides a short air blast from a compressed air source that clears any residual condensation from the optics; a flat optical quality window oriented at Brewster's angle; a shutter positioned at the end of the coated tube that is only opened for brief periods when data is collected to limit exposure of the optics to the outside environment; an optical coating applied to the optics to inhibit moisture condensation; and a mechanical vibrator attached physically to the window to shake off debris and condensation droplets.

2. An apparatus for noncontact open channel fluid flow measurement comprising:
a laser; and
an optical system;
a position adjusting system wherein a lens of the optical system and the laser are positioned a distance apart that causes a focus of transmitted laser light to be at a depth sufficient to avoid spurious contributions to velocity measurements from a surface yet close enough to the surface of a flowing stream so that p-polarized light of significant intensity reaches light scatterers below the surface, wherein
the optical system and laser being positioned and constructed to focus light from the laser to at least one predetermined effective focal point within the flowing stream and to return back scattered light from scatterers at the effective focal point within the flowing stream to a system for obtaining a Doppler beat signal from light generated by the laser and the back scattered light.

3. An apparatus for noncontact open channel fluid flow measurement comprising:
a laser;
an optical system;
the optical system and laser being positioned and constructed to focus light from the laser to at least one predetermined effective focal point within a flowing stream and to return back scattered light from scatterers at the effective focal point within the flowing stream to a system for obtaining a Doppler beat signal from light generated by the laser and the back scattered light; and
at least one microprocessor, said at least one microprocessor including at least one program; said at least one program including commands that divide a time domain signal into segments that are substantially equal to a transit time of particles through a focus of a laser beam, converts the time domain signal into frequency domain signals through the use of an FFT algorithm, and provides enhanced signal processing; whereby a signal-to-noise ratio of a Doppler beat frequency spectrum is increased,
wherein the at least one microprocessor includes software that causes at least some data taken during stable operation of the laser to be stored while data taken during unstable operation of the laser is discarded.

4. An apparatus for noncontact open channel fluid flow measurement comprising:
a laser;
an optical system;
the optical system and laser being positioned and constructed to focus light from the laser to at least one predetermined effective focal point within a flowing stream and to return back scattered light from scatterers at the effective focal point within the flowing stream to a system for obtaining a Doppler beat signal from light generated by the laser and the back scattered light; and
at least one microprocessor, said at least one microprocessor including at least one program; said at least one program including commands that divide a time domain signal into segments that are substantially equal to a transit time of particles through a focus of a laser beam, converts the time domain signal into frequency domain signals through the use of an FFT algorithm, and provides enhanced signal processing; whereby a signal-to-noise ratio of a Doppler beat frequency spectrum is increased,
wherein the at least one microprocessor is connected to control a distance between an optical system and a laser diode to focus the laser beam below the surface of the flowing stream whereby surface contributions to backscattering are avoided.

5. An apparatus for noncontact open channel fluid flow measurement comprising:
a laser;
an optical system;
the optical system and laser being positioned and constructed to focus light from the laser to at least one predetermined effective focal point within a flowing stream and to return back scattered light from scatterers at the effective focal point within the flowing stream to a system for obtaining a Doppler beat signal from light generated by the laser and the back scattered light; and
at least one microprocessor, said at least one microprocessor including at least one program; said at least one program including commands that divide a time domain signal into segments that are substantially equal to a transit time of particles through a focus of a laser beam, converts the time domain signal into frequency domain signals through the use of an FFT algorithm, and provides enhanced signal processing; whereby a signal-to-noise ratio of a Doppler beat frequency spectrum is increased,
wherein the at least one microprocessor includes a program that controls the taking of data and background measurements during a laser turn-on period and analyzes velocity using data taken during at least one stable operation period.

6. An apparatus in accordance with claim 3 further including a level sensor; said level sensor being in electrical communication with the at least one microprocessor; said at least one microprocessor containing a program for focusing the laser beam at a point below the surface of the stream.

7. An apparatus in accordance with claim 6 wherein the level sensor is an ultrasonic sensor.

8. An apparatus for noncontact open channel fluid flow measurement comprising:
a laser;
an optical system;
the optical system and laser being positioned and constructed to focus light from the laser to at least one predetermined effective focal point within a flowing stream and to return back scattered light from scatterers at the effective focal point within the flowing stream to a system for obtaining a Doppler beat signal from light generated by the laser and the back scattered light; and
a position adjusting system wherein a lens of the optical system and the laser are positioned a distance apart that causes a focus of transmitted laser light to be at a depth sufficient to avoid spurious contributions to velocity measurements from the surface yet close enough to the surface of the flowing stream so that p-polarized light of significant intensity reaches light scatterers below the surface, wherein
the laser is linearly polarized and oriented to transmit light substantially at Brewster's angle for p-polarized light as a beam enters the flow.

9. An apparatus for noncontact open channel fluid flow measurement comprising:

a laser;
an optical system;
a protective system that protects the optical system;
the optical system and laser being positioned and constructed to focus light from the laser to at least one predetermined effective focal point within a flowing stream and to return back scattered light from scatterers at the effective focal point within the flowing stream to a system for obtaining a Doppler beat signal from light generated by the laser and the back scattered light;
a position adjusting system wherein a lens of the optical system and the laser are positioned a distance apart that causes a focus of transmitted laser light to be at a depth sufficient to avoid spurious contributions to velocity measurements from the surface yet close enough to the surface of the flowing stream so that p-polarized light of significant intensity reaches light scatterers below the surface.

10. An apparatus in accordance with claim 9 wherein the protective system includes a tube; an inner surface of the tube being coated with a hydrophilic material that draws moisture away from the optical system.

11. An apparatus in accordance with claim 9 wherein the protective system includes a source of compressed gas and a valve arrangement that provides a short gas blast from the source of compressed gas that clears any residual condensation from the optical system.

12. An apparatus in accordance with claim 9 wherein the protective system includes a flat optical quality window oriented at an angle; the angle being substantially at Brewster's angle; a shutter positioned at the end of a coated tube that is only opened for brief periods when data is collected to limit exposure of the optical system to an outside environment; a mechanical vibrator physically attached to said window to shake off debris or condensation droplets.

13. An apparatus in accordance with claim 9 wherein the protective system includes an optical coating applied to optics of the apparatus to inhibit moisture condensation.

14. An apparatus in accordance with claim 3 wherein the optical system and laser are positioned to transmit light into the flow substantially at Brewster's angle.

15. An apparatus according to claim 3 wherein said at least one microprocessor includes at least one program that focuses light from the laser to a first focal point and a second focal point; and a photodetector measures intensities of the light reflected from the first focal point and the second focal point, wherein said at least one program determines turbidity from a distance between the first and second focal points and the difference between light intensities at the first and second focal points.

16. An apparatus in accordance with claim 15 wherein said program for determining the turbidity correlates a variation in the strength of backscattered signal to the turbidity of a flowing stream wherein a higher rate of attenuation of backscatter with depth results in a determination of greater turbidity.

17. An apparatus for measuring turbidity, comprising:
at least one microprocessor;
a narrow linewidth laser;
an optical system;
said at least one microprocessor including a program that focuses light from the laser to a first focal point and a second focal point; wherein the first focal point is at a first focus location and the second focal point is at a second focus location; and
a photodetector measures intensities of light reflected from the first focal point and the second focal point, wherein said at least one microprocessor includes a program for determining the turbidity from a distance between the first and second focal points and a difference between light intensities at the first and second focal points,
wherein the at least one microprocessor is calibrated to provide a scale of turbidity.

18. A method of noncontact open channel fluid flow measurement with a laser Doppler velocimeter, comprising the steps of:
transmitting a beam of light from a self-mixing and self amplifying laser diode through an optical system to a focal point within a flowing stream;
applying backreflections from scatterers within the flowing stream to the self-mixing and self amplifying laser diode whereby a time domain Doppler beat signal is obtained;
dividing the time domain Doppler beat signal into segments that are substantially equal to a transit time of scatters through a focus of a laser beam;
converting the segments to a frequency domain through the use of an FFT algorithm to obtain resultant frequency spectra; and
processing the resultant frequency spectra together to produce an enhanced signal spectrum whereby a signal-to-noise ratio of the Doppler beat frequency spectrum is increased, wherein the step of processing the resultant frequency spectra together to produce an enhanced signal spectrum includes the step of adding the resultant frequency spectra together.

19. A method in accordance with claim 18 further including the steps of obtaining a background spectra and using the background spectra to eliminate peaks common to both signal and background spectra to identify a peak in the signal spectrum that corresponds to a fluid flow rate.

20. A method of noncontact open channel fluid flow measurement with a laser Doppler velocimeter, comprising the steps of:
transmitting a beam of light from a self-mixing and self amplifying laser diode through an optical system to a focal point within a flowing stream;
applying backreflections from scatterers within the flowing stream to the self-mixing and self amplifying laser diode whereby a time domain Doppler beat signal is obtained;
dividing the time domain Doppler beat signal into segments that are substantially equal to a transit time of scatters through a focus of a laser beam;
converting the segments to a frequency domain through the use of an FFT algorithm to obtain resultant frequency spectra; and
processing the resultant frequency spectra together to produce an enhanced signal spectrum whereby a signal-to-noise ratio of the Doppler beat frequency spectrum is increased
further including the steps of obtaining a background spectra and using the background spectra to eliminate peaks common to both signal and background spectra to identify a peak in the signal spectrum that corresponds to a fluid flow rate,
wherein the step of obtaining a background spectrum includes the steps of:
either blocking an outgoing laser beam or defocusing it so that there is no beam focus point anywhere in the flowing stream;
receiving electromagnetic signals with one of a photodetector and the self-mixing and self amplifying laser diode;
dividing a time domain electromagnetic signal into segments;

converting the segments to the frequency domain through the use of an FFT algorithm to obtain resultant frequency spectra;

processing the resultant frequency spectra together to produce an enhanced background signal spectrum; and comparing the signal frequency spectra to the background spectra to determine which peak in the signal spectra corresponds to a fluid flow rate.

21. A method in accordance with claim 18 further including the steps of producing a measurable shift in a Doppler beat frequency and using the shift in the Doppler beat frequency to determine either the direction of fluid movement in an open channel flow or to confirm a no flow condition.

22. A method in accordance with claim 18 wherein the step of producing a measurable shift in a Doppler beat frequency includes the step of moving the laser diode at speeds sufficient to produce a measurable shift in the Doppler beat frequency.

* * * * *